US010367385B2

(12) United States Patent
Mikami et al.

(10) Patent No.: US 10,367,385 B2
(45) Date of Patent: Jul. 30, 2019

(54) MOTOR

(71) Applicant: DENSO CORPORATION, Aichi-pref. (JP)

(72) Inventors: Koji Mikami, Kosai (JP); Yoji Yamada, Hamamatsu (JP); Akihisa Hattori, Toyohashi (JP); Seiya Yokoyama, Toyohashi (JP)

(73) Assignee: DENSO CORPORATION, Aichi-pref. (JP)

( * ) Notice: Subject to any disclaimer, the term of this patent is extended or adjusted under 35 U.S.C. 154(b) by 27 days.

(21) Appl. No.: 15/745,241

(22) PCT Filed: Jul. 19, 2016

(86) PCT No.: PCT/JP2016/071104
§ 371 (c)(1),
(2) Date: Jan. 16, 2018

(87) PCT Pub. No.: WO2017/014211
PCT Pub. Date: Jan. 26, 2017

(65) Prior Publication Data
US 2018/0269733 A1 Sep. 20, 2018

(30) Foreign Application Priority Data

| | | |
|---|---|---|
| Jul. 21, 2015 | (JP) | 2015-144308 |
| Dec. 24, 2015 | (JP) | 2015-251812 |
| Mar. 14, 2016 | (JP) | 2016-050075 |

(51) Int. Cl.

| | |
|---|---|
| ***H02K 1/27*** | (2006.01) |
| ***H02K 21/14*** | (2006.01) |
| ***H02K 3/28*** | (2006.01) |

(52) U.S. Cl.
CPC ............. *H02K 1/2766* (2013.01); *H02K 1/27* (2013.01); *H02K 1/278* (2013.01); *H02K 3/28* (2013.01); *H02K 21/14* (2013.01)

(58) Field of Classification Search
CPC ........ H02K 21/14; H02K 1/27; H02K 1/2766; H02K 1/278; H02K 3/28
(Continued)

(56) References Cited

U.S. PATENT DOCUMENTS 4,918,831 A * 4/1990 Kliman ................. H02K 1/246 228/185
6,034,460 A 3/2000 Tajima et al.
(Continued)

FOREIGN PATENT DOCUMENTS

JP 09285088 A 10/1997
JP 2001346368 A * 12/2001
(Continued)

OTHER PUBLICATIONS

JP-2001346368-A—JPO machine translation, Miyashita, Toshihito, Synchronous Motor Comprising a Permanent Magnet, All-pages, (Year: 2001).*

(Continued)

*Primary Examiner* — Naishadh N Desai
(74) *Attorney, Agent, or Firm* — Kilpatrick Townsend & Stockton LLP

(57) ABSTRACT

This motor includes a stator having a winding, and a rotor. The rotor rotates by being subjected to a rotating magnetic field generated when a drive current is supplied to the winding. The winding includes a first winding and a second winding. The first winding and the second winding are energized with the same timing by the drive current, and are connected in series. The rotor includes magnetic poles comprising permanent magnets, and magnetic flux permit-
(Continued)

ting portions. In a rotor rotational position in which the magnetic poles oppose the first winding, the magnetic flux permitting portions oppose the second winding and permit the generation of an interlinkage magnetic flux arising as a result of a field weakening current in the second winding.

11 Claims, 16 Drawing Sheets

(58) Field of Classification Search
USPC .................................................. 310/179–210
See application file for complete search history.

(56) References Cited

U.S. PATENT DOCUMENTS

| | | | | |
|---|---|---|---|---|
| 6,211,593 | B1 | 4/2001 | Nashiki | |
| 6,271,616 | B1 | 8/2001 | Akemakou | |
| 6,396,183 | B1 | 5/2002 | Tajima et al. | |
| 2001/0028201 | A1* | 10/2001 | Miyashita | H02K 1/276 310/156.38 |
| 2002/0074887 | A1 | 6/2002 | Takano et al. | |
| 2002/0130575 | A1 | 9/2002 | Tajima et al. | |
| 2002/0130576 | A1 | 9/2002 | Tajima et al. | |
| 2004/0174084 | A1 | 9/2004 | Tajima et al. | |
| 2006/0017344 | A1 | 1/2006 | Tajima et al. | |
| 2006/0017346 | A1 | 1/2006 | Tajima et al. | |
| 2006/0017419 | A1 | 1/2006 | Tajima et al. | |
| 2008/0284270 | A1 | 11/2008 | Tajima et al. | |
| 2008/0296994 | A1* | 12/2008 | El-Refaie | H02K 1/246 310/216.004 |
| 2009/0309449 | A1 | 12/2009 | Tajima et al. | |
| 2012/0001509 | A1 | 1/2012 | Yamada et al. | |
| 2014/0062249 | A1 | 3/2014 | Nagao et al. | |
| 2014/0265703 | A1 | 9/2014 | Yamada et al. | |
| 2017/0244292 | A1* | 8/2017 | Zhong | H02K 1/2706 |

FOREIGN PATENT DOCUMENTS

| | | | |
|---|---|---|---|
| JP | 2001346368 | A | 12/2001 |
| JP | 2002209349 | A | 7/2002 |
| JP | 2002252941 | A | 9/2002 |
| JP | 2002534047 | A | 10/2002 |
| JP | 2010094001 | A | 4/2010 |
| JP | 2011083066 | A | 4/2011 |
| JP | 2012034520 | A | 2/2012 |
| JP | 2014135852 | A | 7/2014 |
| JP | 2015095999 | A | 5/2015 |

OTHER PUBLICATIONS

Translation of International Preliminary Report on Patentability corresponding to PCT/JP2016/071104, dated Jan. 23, 2018, five pages.

International Search Report corresponding to PCT/JP2016/071104, dated Oct. 5, 2016, two pages.

Office Action for Chinese Appln No. 201680041645.7 dated Apr. 28, 2019, all pages.

* cited by examiner

MOTOR

TECHNICAL FIELD

The present invention relates to a motor.

BACKGROUND ART

In the prior art, as described in, for example, patent document 1, a permanent magnet motor such as a brushless motor includes a stator, which is formed by windings wound around a stator core, and a rotor, which uses permanent magnets opposing the stator, as magnetic poles. The windings of the stator are supplied with drive currents to generate a rotational magnetic field that rotates the rotor.

PATENT DOCUMENT

Patent Document 1: Japanese Laid-Open Patent Publication No. 2014-135852

SUMMARY OF THE INVENTION

Problems that are to be Solved by the Invention

In a permanent magnet motor such as that described above, when the rotor is driven to rotate at a higher speed, an increase in flux linkage resulting from the permanent magnets of the rotor increases the induced voltage generated at the windings of the stator. The induced voltage lowers the motor output and hinders rotation of the rotor at a higher speed.

It is an object of the present invention to provide a motor that allows for rotation at a higher speed.

Means for Solving the Problem

To achieve the above object, a motor according to one aspect of the present invention includes a stator and a rotor. The stator includes windings, and the rotor is rotated by a rotation field generated when drive currents are supplied to the windings. The windings include a first winding and a second winding, in which the first winding and the second winding are synchronously excited by the drive currents and connected in series. The rotor includes a magnet pole, which includes a permanent magnet, and a flux toleration portion. The flux toleration portion is opposed to the second winding at a rotational position where the magnet pole opposes the first winding, and the flux toleration portion tolerates generation of a flux linkage resulting from a field weakening current at the second winding.

EMBODIMENTS OF THE INVENTION

One embodiment of a motor will now be described.

Figure 1A:
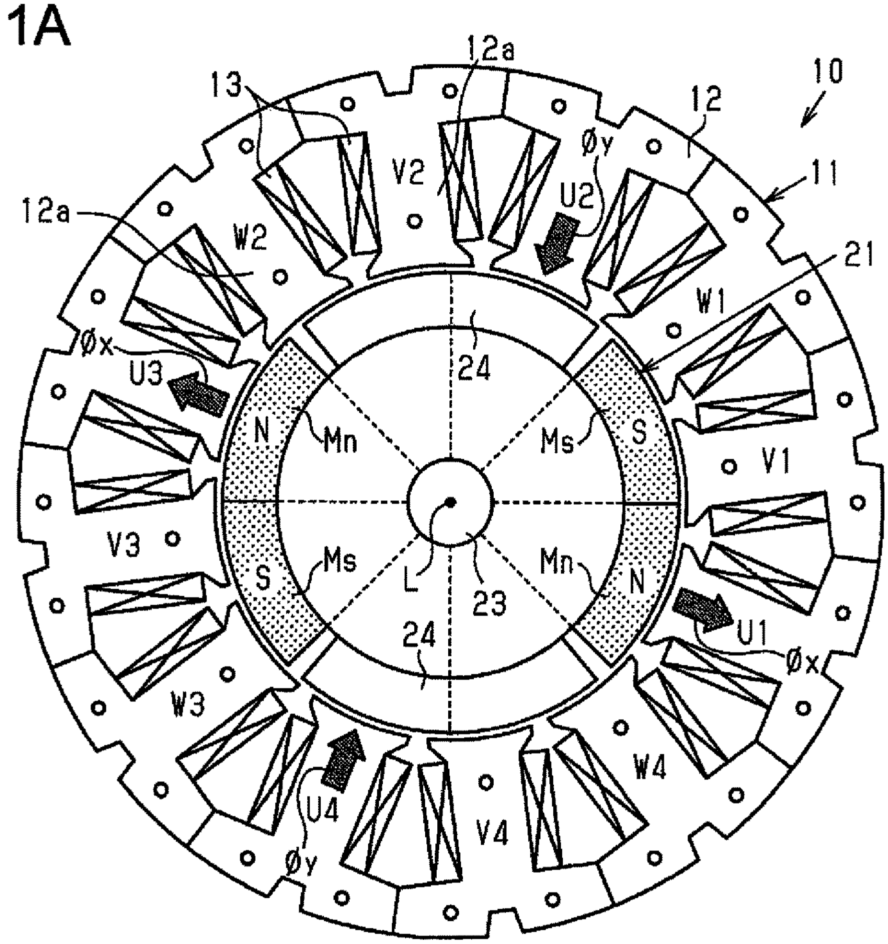
FIG. 1A is a plan view of a motor according to one embodiment of the present invention.

As shown in FIG. 1A, a motor 10 of the present embodiment is configured as a brushless motor and includes an annular stator 11 and a rotor 21 arranged at an inner side of the stator 11.

Structure of Stator

The stator 11 includes a stator core 12 and windings 13 wound around the stator core 12. The stator core 12 is substantially ring-shaped and formed from a magnetic metal. The stator core 12 includes twelve teeth 12*a* extending inward and arranged in the radial direction at equal angular intervals in the circumferential direction.

There are twelve windings 13, the number of which is the same as the teeth 12*a*. The windings 13 are wound as concentrated windings in the same direction around the teeth 12*a*, respectively. That is, the twelve windings 13 are arranged in the circumferential direction at equal angular intervals (thirty-degree intervals). The windings 13 are classified into three phases in accordance with the supplied drive currents of three phases (U-phase, V-phase, and W-phase) and indicated in order in the counterclockwise direction as U1, V1, W1, U2, V2, W2, U3, V3, W3, U4, V4, and W4 in FIG. 1A.

With regard to each phase, the U-phase windings U1 to U4 are arranged in the circumferential direction at equal angular intervals (ninety-degree intervals). In the same manner, the V-phase windings V1 to V4 are arranged in the circumferential direction at equal angular intervals (ninety-degree intervals). The W-phase windings W1 to W4 are also arranged in the circumferential direction at equal angular intervals (ninety-degree intervals).

Figure 2:
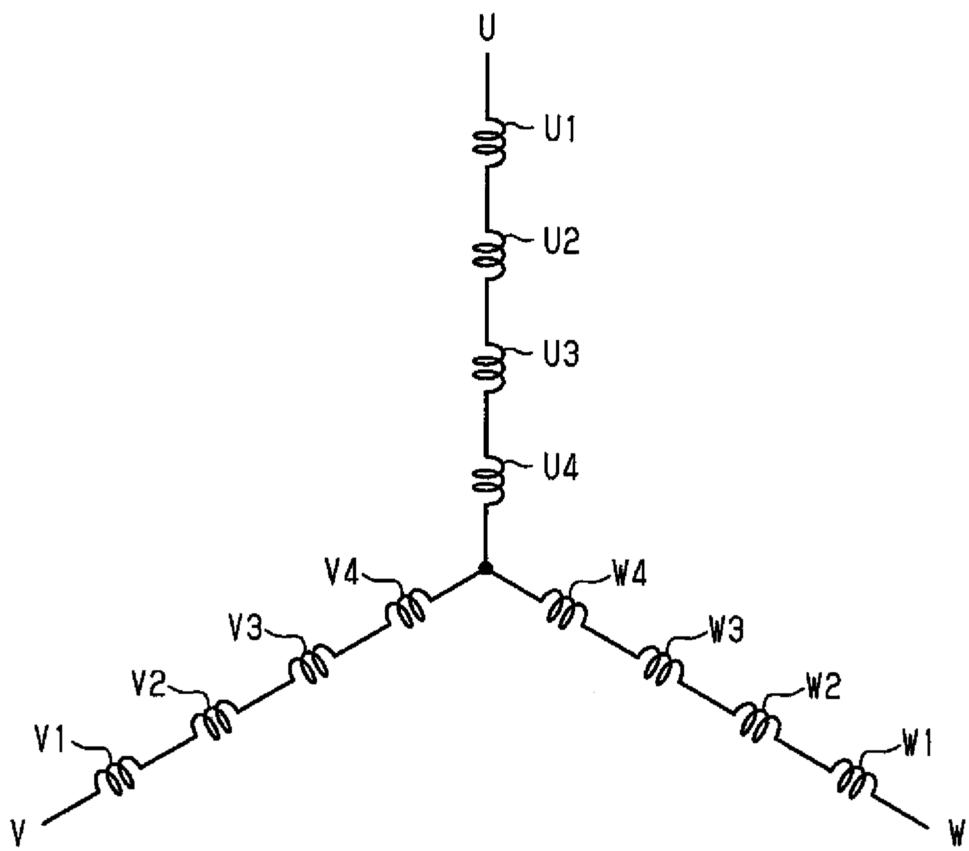
FIG. 2 is an electric circuit diagram showing the connection of windings shown in FIG. 1A.

As shown in FIG. 2, the windings 13 in each phase are connected in series. That is, the U-phase windings U1 to U4, the V-phase windings V1 to V4, and the W-phase windings W1 to W4 respectively form series circuits. In the present embodiment, the series circuit of the U-phase windings U1 to U4, the series circuit of the V-phase windings V1 to V4, and the series circuit of the W-phase windings W1 to W4 are in a star connection.

Structure of Rotor

Figure 1B:
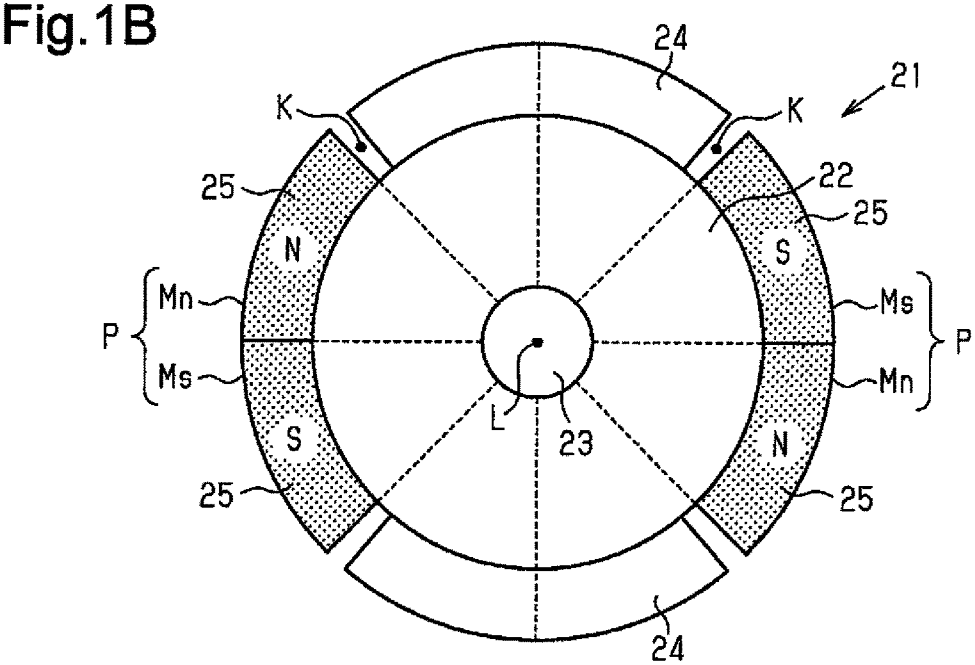
FIG. 1B is a plan view of a rotor shown in FIG. 1A.

As shown in FIG. 1B, a rotor core 22 of the rotor 21 is substantially disk-shaped and formed from a magnetic metal. A rotation shaft 23 is fixed to the central portion of the rotor core 22. An outer circumferential portion of the rotor core 22 includes magnet pole pairs P (magnetic pole sets) and projections 24 that are alternately arranged in the circumferential direction. Each magnet pole pair P includes an N-magnet pole Mn and an S-magnet pole Ms that are adjacent to each other in the circumferential direction. The projections 24 are formed integrally with the rotor core 22. In the present embodiment, there are two magnet pole pairs P and two projections 24. The two magnet pole pairs P are arranged in the circumferential direction at 180-degree opposing positions. The two projections 24 are also arranged in the circumferential direction at 180-degree opposing positions.

The N-magnet poles Mn and the S-magnet poles Ms each include a permanent magnet 25 fixed to the outer circumferential surface of the rotor core 22. Thus, the rotor 21 has a surface magnetic construction (SPM structure) in which four permanent magnets 25 are fixed to the outer circumferential surface of the rotor core 22. The permanent magnets 25 are identical in shape. The outer circumferential surface of each permanent magnet 25 is arcuate and extends about an axis L of the rotation shaft 23 as viewed in the direction of the axis L.

Each permanent magnet 25 is formed so that the magnetic orientation is directed in the radial direction. In further detail, each permanent magnet 25 having the N-magnet pole Mn is magnetized so that the magnetic pole formed at the outer circumference side is the N-pole, and each permanent magnet 25 having the S-magnet pole Ms is magnetized so that the magnetic pole formed at the outer circumference side is the S-pole. The permanent magnets 25 are, for example, anisotropic sintered magnets and configured by, for example, neodymium magnets, samarium-cobalt (SmCo) magnets, SmFeN magnets, ferrite magnets, alnico magnets, or the like. The permanent magnets 25 are arranged so that those of the same polarity are arranged in the circumferential direction at 180-degree opposing positions. That is, the N-magnet poles Mn are arranged at 180-degree opposing positions, and the S-magnet poles Ms are arranged at 180-degree opposing positions.

The open angle (occupied angle) of the permanent magnets 25 about the axis L is set to $(360/2n)°$, where n represents the total number of the magnet poles Mn and Ms (number of permanent magnets 25). In the present embodiment, the total number of the magnet poles Mn and Ms is four. Thus, the open angle of each permanent magnet 25 is set to 45°. Further, the N-pole permanent magnet 25 and the S-pole permanent magnet 25 of each magnet pole pair P are arranged adjacent to each other in the circumferential direction. Thus, the open angle of each magnet pole pair P is set to 90° in correspondence with the two permanent magnets 25.

Each projection 24 of the rotor core 22 is formed projecting outward in the radial direction between the magnet pole pairs P in the circumferential direction. In other words, each projection 24 is configured so that one side in the circumferential direction is adjacent to an N-pole permanent magnet 25 and the other side in the circumferential direction is adjacent to an S-pole permanent magnet 25. Further, the outer circumferential surface of each projection 24 is arcuate about the axis L as viewed in the direction of the axis L of the rotation shaft 23, and the outer circumferential surfaces of the projections 24 are flush with the outer circumferential surfaces of the permanent magnets 25.

The two circumferential ends of each projection 24 are spaced apart by gaps K from the adjacent permanent magnets 25. The open angle about the axis L of each projection 24 is set to be smaller than the open angle of each magnet pole pair P (90°) by an amount corresponding to the gaps K The operation of the present embodiment will now be described.

A drive circuit (not shown) supplies drive currents (AC) of three phases having phase differences of 120° to the U-phase windings U1 to U4, the V-phase windings V1 to V4, and the W-phase windings W1 to W4, respectively. Thus, in the windings U1 to W4, those of the same phase are synchronously excited. This generates a rotational magnetic field in the stator 11. The rotational magnetic field rotates the rotor 21. The supply of the three-phase drive currents forms poles in the stator 11 so that those having the same phases in the windings U1 to W4 have the same polarity. In the present embodiment, the number of the magnetic poles of the rotor 21 (number of magnet poles Mn and Ms) is four. However, in the windings U1 to W4, those of each phase is supplied with drive current set assuming that the number of poles of the rotor 21 is two times the number of the magnet poles Mn and Ms (eight poles in the present embodiment).

During high-speed rotation of the rotor 21, field weakening control is executed to supply the windings 13 with field weakening current (d-axis current). During high-speed rotation of the rotor 21 (during field weakening control), for example, as shown in FIG. 1A, when the N-magnet poles Mn radially oppose the U-phase windings U1 and U3, the two projections 24 radially oppose the U-phase windings U2 and U4.

In this case, the U-phase windings U1 to U4 are each supplied with a field weakening current. However, in the U-phase windings U1 and U3, the opposing N-magnet poles Mn generate flux (flux toward outer side in radial direction) that exceeds the flux linkage resulting from the field weakening current (flux linkage toward radially inner side). This generates flux linkage $\phi x$ that passes through the U-phase windings U1 and U3 toward the outer side in the radial direction.

In the U-phase windings U2 and U4, the opposing portions of the rotor 21 are the projections 24 of the rotor core 22 and not the magnet poles Mn. Thus, flux linkage $\phi y$ resulting from the field current is not eliminated, and the flux linkage $\phi y$ passes the U-phase windings U2 and U4 toward the inner side in the radial direction. In other words, the projections 24 of the rotor core 22, which are opposed to the U-phase windings U2 and U4, are configured as flux toleration portions that tolerate the generation of the flux linkage $\phi y$ resulting from the field weakening current. Thus, the magnet poles Mn generate the flux linkage $\phi y$ at the U-phase windings U2 and U4. The phase of the flux linkage $\phi y$ is inverted from the phase of the flux linkage $\phi x$ generated at the U-phase windings U1 and U3. The flux linkages $\phi x$ and $\phi y$ generate induced voltage at the U-phase windings U1 to U4. The effect described above also occurs when the S-magnet poles Ms are, for example, opposed to the U-phase windings U1 and U3.

Figure 3A:
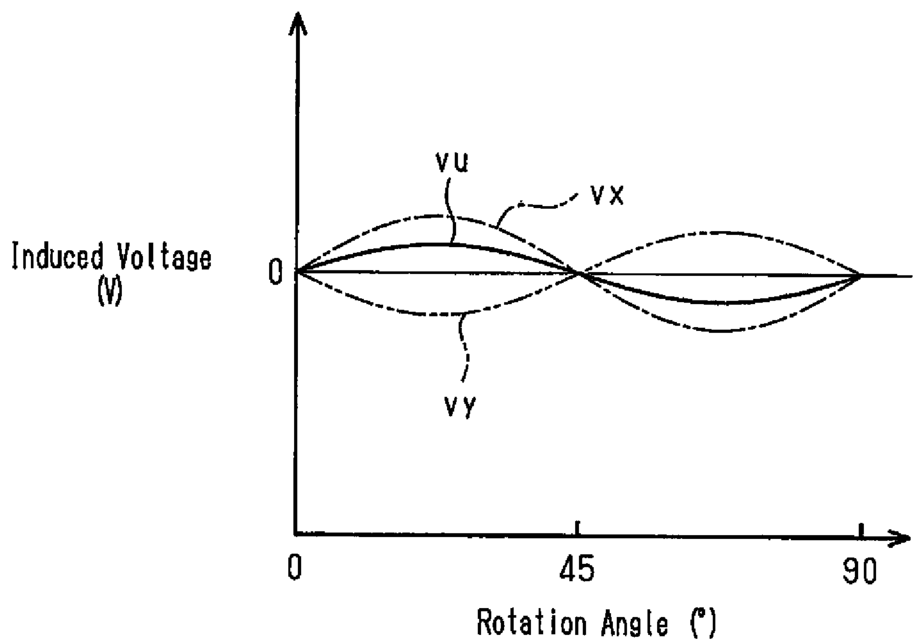
FIG. 3A is a graph illustrating changes in the induced voltage generated at a U-phase winding during rotation of the rotor shown in FIG. 1A.
Figure 3B:
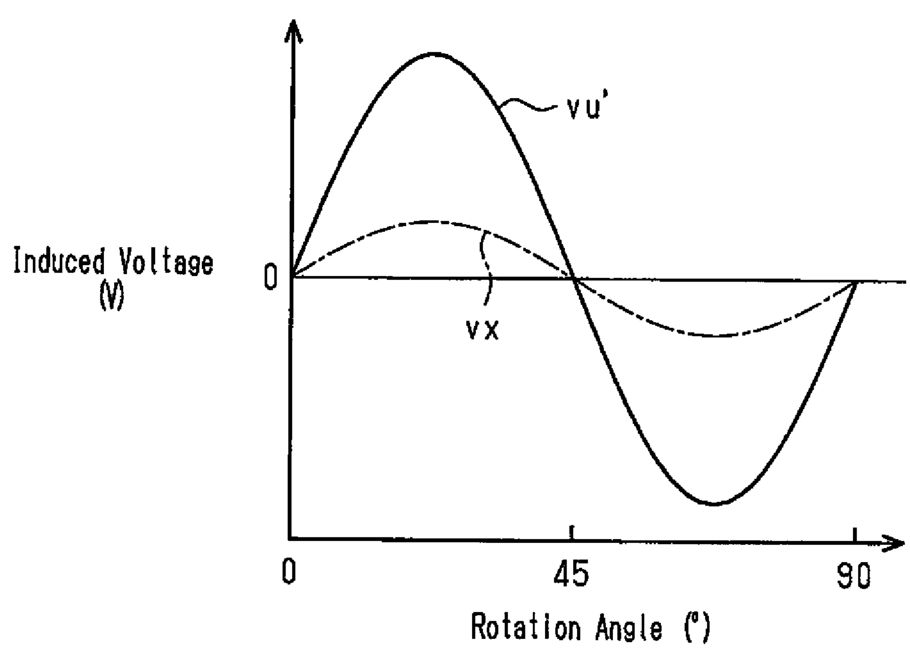
FIG. 3B is a graph illustrating changes in the induced voltage generated at a U-phase winding during rotation of a rotor in a conventional structure.

FIG. 3A shows changes in a predetermined rotation range (90°) of the induced voltage generated at the U-phase windings U1 to U4 during high-speed rotation of the rotor 21 in the present embodiment. FIG. 3B shows changes in a predetermined rotation range (90°) of the induced voltage generated at the U-phase windings U1 to U4 during high-speed rotation of the rotor. The conventional structure is a structure in which an eight-pole rotor has uniform poles, that is, a structure in which four N-pole permanent magnets and four S-pole permanent magnets are alternately arranged at equal angular intervals in the circumferential direction.

In the conventional structure, the uniform poles of the rotor generate flux linkage in the same direction at each of the U-phase windings U1 to U4. Thus, as shown in FIG. 3B, the U-phase windings U1 to U4 each generate an equal induced voltage vx. Further, when the U-phase windings U1 to U4 are connected in series, the combined induced voltage vu', which combines the induced voltage vx generated at each of the U-phase windings U1 to U4, is the sum of the induced voltages vx of the U-phase windings U1 to U4 (i.e., four times greater than the induced voltage vx).

In the present embodiment, as described above, the flux linkage ϕy, of which the phase is inverted from the phase of the flux linkage ϕx generated at the U-phase windings U1 and U3 by the magnet poles Mn and Ms, is generated at, for example, the U-phase windings U2 and U4 opposing the projections 24 of the rotor core 22. Thus, as shown in FIG. 3A, the induced voltage vy generated at each of the U-phase windings U2 and U4 has an inverted polarity (inverted phase) with respect to the induced voltage vx generated at each of the U-phase windings U1 and U3. As a result, the combined induced voltage vu, which combines the induced voltages at the U-phase windings U1 to U4 ($vu=vx\times 2+vy\times 2$), is effectively decreased compared with the combined induced voltage vu' (refer to FIG. 3B) in the conventional structure.

Here, an example using the combined induced voltage vu of the U-phase windings U1 to U4 has been described. In the same manner, the projections 24 of the rotor core 22 also decrease the combined induced voltage at the V-phase windings V1 to V4 and the W-phase windings W1 to W4

The present embodiment has the advantages described below.

(1) In correspondence with the supplied drive currents of three phases, the windings 13 of the stator 11 include the four U-phase windings U1 to U4, the four V-phase windings V1 to V4, and the four W-phase windings W1 to W4. The four windings of each phase are connected in series. That is, the windings 13 of the stator 11 include at least two series-connected windings (first winding and second winding) for each phase.

The rotor 21 includes the magnet poles Mn and Ms, which include the permanent magnets 25, and the projections 24 of the rotor core 22 (flux toleration portion), which are opposed to the U-phase windings U2 and U4 at rotational positions where, for example, the magnet poles Mn (or magnet poles Ms) oppose the U-phase windings U1 and U3. The projections 24 of the rotor core 22 tolerate the generation of flux linkage ϕy resulting from the field weakening current at the opposing windings 13 (e.g., U-phase windings U2 and U4).

With this structure, the induced voltage vy generated by the flux linkage ϕy resulting from the field weakening current at the windings 13 opposing the projections 24 of the rotor core 22 has an inverted polarity with respect to the induced voltage vx generated at the windings 13 opposed to the magnet poles Mn (or magnet poles Ms) (refer to FIG. 3A). This lowers the combined induced voltage vu, which combines the induced voltages vx and vy. As a result, the motor 10 can be rotated at a higher speed.

When a winding construction connects the windings 13 of each phase in series like in the present embodiment, the sum of the induced voltage generated at each winding for each phase is the combined induced voltage. Accordingly, there is a tendency for the combined induced voltage to increase. Thus, in a construction in which the windings 13 of each phase are connected in series, the arrangement of the projections 24 on the rotor 21 increases the effect for reducing the combined induced voltage vu and allows the motor 10 to be rotated at a higher speed in an further optimal manner.

Further, the rotor 21 includes the projections 24. This reduces the field weakening current supplied to the windings 13. The reduced field weakening current limits demagnetization of the permanent magnet 25 during field weakening control and limits copper loss of the windings 13. In other words, the flux linkage amount that can be reduced by the same amount of field weakening current increases. This allows the field weakening control to further effectively increase the rotation speed.

(2) The magnet poles Mn and Ms are formed by fixing the permanent magnets 25 to the outer circumferential surface of the rotor core 22. That is, the rotor 21 has a surface magnet structure (SPM structure). This contributes to increasing the torque of the motor 10.

(3) The projections 24 of the rotor core 22 that serve as flux toleration portions are formed at the same positions in the radial direction as the permanent magnets 25. This structure allows the projections 24 of the rotor core 22 (flux toleration portion) to be opposed to the poles of the stator 11 (teeth 12*a* and windings 13) at a closer distance. Thus, the magnetic resistance (air gap) can be reduced between the teeth 12*a* and the projections 24 of the rotor core 22. This increases the flux linkage ϕy generated by the field weakening current at the windings 13 opposed to the projections 24 of the rotor core 22. As a result, the combined induced voltage vu can be reduced in a further optimal manner.

(4) A plurality of (two sets of) the magnet pole pairs P (magnet pole sets), each including the N-magnet pole Mn and the S-magnet pole Ms arranged adjacent to each other in the circumferential direction, are arranged at equal angular intervals in the circumferential direction. This allows the structure of the rotor 21 to be magnetically and mechanically well-balanced.

The above embodiment may be modified as described below.

In the above embodiment, the windings for each phase, namely, the U-phase windings U1 to U4, the V-phase windings V1 to V4, and the W-phase windings W1 to W4 are connected in series. However, there is no such limitation, and the winding arrangement may be changed when required.

Figure 4:
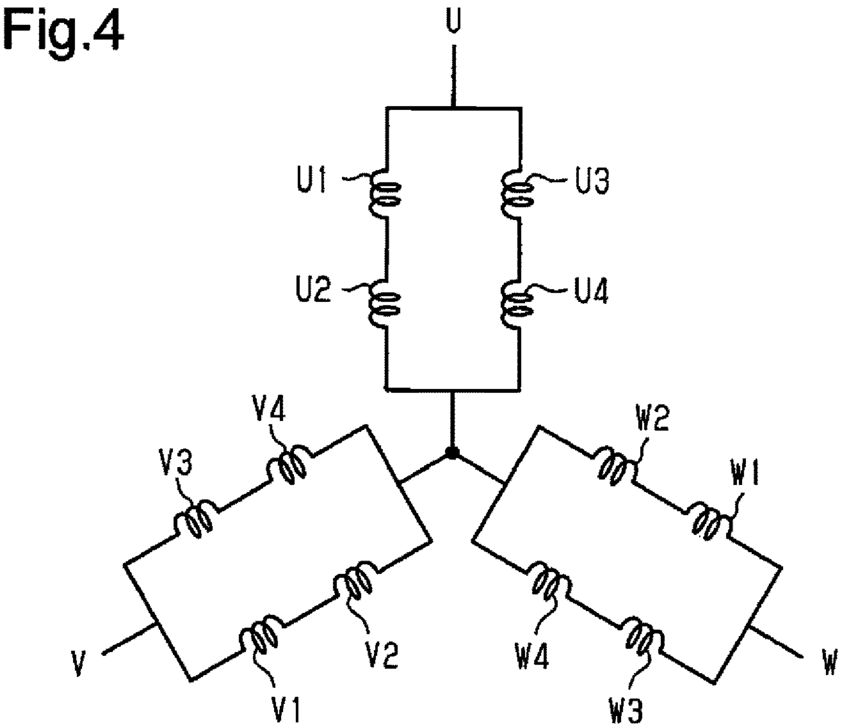
FIG. 4 is an electric circuit diagram showing the connection of windings in a further example.

For instance, in the example of FIG. 4, with regard to the U-phase, the windings U1 and U2 are connected in series, the windings U3 and U4 are connected in series, and the series-connected pair of the windings U1 and U2 is connected in parallel to the series-connected pair of the windings U3 and U4. In the same manner, with regard to the V-phase, the windings V1 and V2 are connected in series, the windings V3 and V4 are connected in series, and the series-connected pair of the windings V1 and V2 is connected in parallel to the series-connected pair of the windings V3 and V4. In the same manner, with regard to the W-phase, the windings W1 and W2 are connected in series, the windings W3 and W4 are connected in series, and the series-connected pair of the windings W1 and W2 is connected in parallel to the series-connected pair of the windings W3 and W4.

When applying the winding arrangement of FIG. 4 to the structure of the rotor 21 in the above embodiment (refer to FIG. 1), for example, induced voltages (induced voltage vx) of the same level are generated at the winding U1 and the winding U3. Further, induced voltages (induced voltage vy) of the same level are generated at the windings U2 and the winding U4. Thus, the combined induced voltage generated at the series-connected pair of the windings U1 and U2 is substantially equal (vx+vy) to the combined induced voltage generated at the series-connected pair of the windings U3 and U4. Accordingly, the reduction in the induced voltage resulting from the projections 24 serving as the flux toleration portions constantly occurs at both of the series-connected pair of the windings U1 and U2 and the series-connected pair of the windings U3 and U4. Further, the series-connected pair of the windings U1 and U2 is connected in parallel to the series-connected pair of the windings U3 and U4. Thus, the combined induced voltage vu of all of the U-phase windings is substantially equal to the combined induced voltage of the windings U1 and U2 (and combined induced voltage of series-connected pair of windings U3 and U4) (vx+vy). This effectively reduces the combined induced voltage vu.

A case will now be considered in which the winding U2 and the winding U3 are exchanged with each other in the example of FIG. 4, that is, the windings U1 and U3 having the same induced voltage are connected in series, and the windings U2 and U4 having the same induced voltage are connected in series. In this case, the reduction in the induced voltage resulting from the projections 24 occurs at only one of the series-connected pair of the windings U2 and U4 and the series-connected pair of the windings U1 and U3. The reduction in the induced voltage does not occur at the other one of the series-connected pairs. Further, the series-connected pair of the windings U1 and U3 is connected in parallel to the series-connected pair of the windings U2 and U4. This is disadvantageous for effectively reducing the combined effective voltage in all of the U-phase windings. In the same manner, when the U-phase windings U1 to U4 are connected in parallel, this is disadvantageous for effectively reducing the combined effective voltage in all of U-phase windings.

As described above, when connecting the windings of each phase in series, the windings (e.g., U-phase winding U1 and U-phase winding U2) opposing the magnet poles Mn (magnet poles Ms) and the projections 24 at a predetermined rotational position of the rotor 21 are connected in series. Thus, the combined induced voltage is obtained by adding the induced voltages having inverted polarities (inverted phases) generated at the windings of the same phase that are connected in series. This effectively reduces the combined induced voltage of each phase.

In the example of FIG. 4, with regard to the U-phase, the windings U1 and U2 are connected in series as a pair, and the windings U3 and U4 are connected in series as a pair. However, when connecting the windings U1 and U4 in series as a pair and connecting the windings U2 and U3 in series as a pair, the same advantages can be obtained. Further, similar changes may be made to the V-phase and the W-phase.

Further, in the example of FIG. 4, with regard to the U-phase, the series-connected pair of the windings U1 and U2 is connected in parallel to the series-connected pair of the windings U3 and U4. Instead, the series-connected pair of the windings U1 and U2 can be separated from the series-connected pair of the windings U3 and U4, and a pair of inverters may be arranged to supply U-phase drive current to each of the separated series-connected pairs. This configuration obtains the same advantages. Similar changes can be made to the V-phase and the W-phase.

In the above embodiment (refer to FIG. 2) and the example of FIG. 4, the windings form a star connection. Instead, the windings may form, for example, a delta connection.

Figure 5:
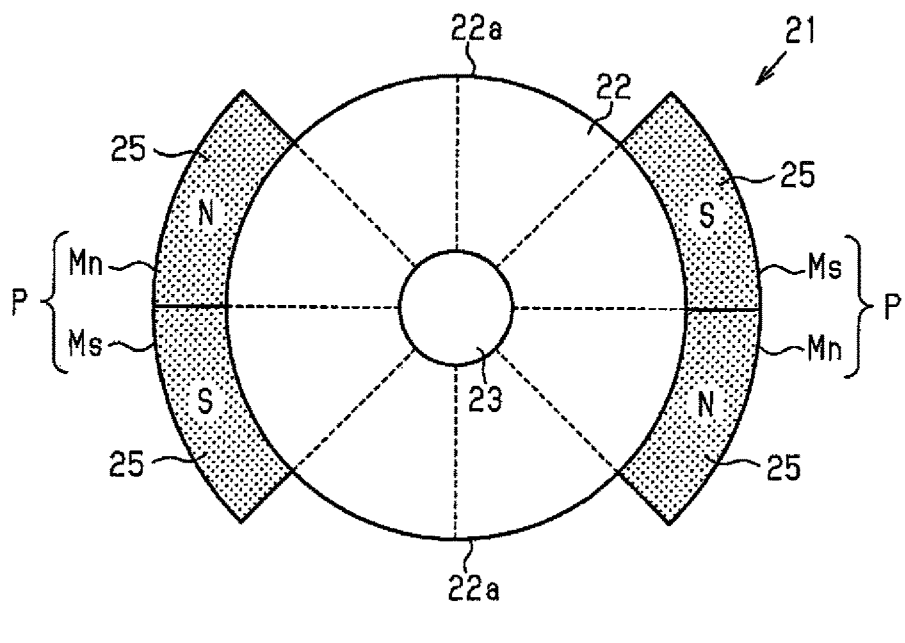
FIG. 5 is a plan view of a rotor having an SPM structure in a further example.

In the above embodiment, the projections 24 project from the rotor core 22 between the magnet pole pairs P in the circumferential direction. However, for example, as shown in FIG. 5, the projections 24 may be omitted from the rotor 21 of the above embodiment, that is, the rotor core 22 may have a circular contour in an axial view. In this structure, exposed surfaces 22*a* defined by the outer circumferential surface of the rotor core 22 where the permanent magnets 25 are not fixed function as the flux toleration portion. Such a structure also obtains advantage (1) of the above embodiment.

In the rotor 21 of the above embodiment, the magnet poles Mn and Ms (permanent magnets 25) are arranged so that those of the same polarity are arranged at 180-degree opposing positions. However, there is no limit to such an arrangement.

Figure 6:
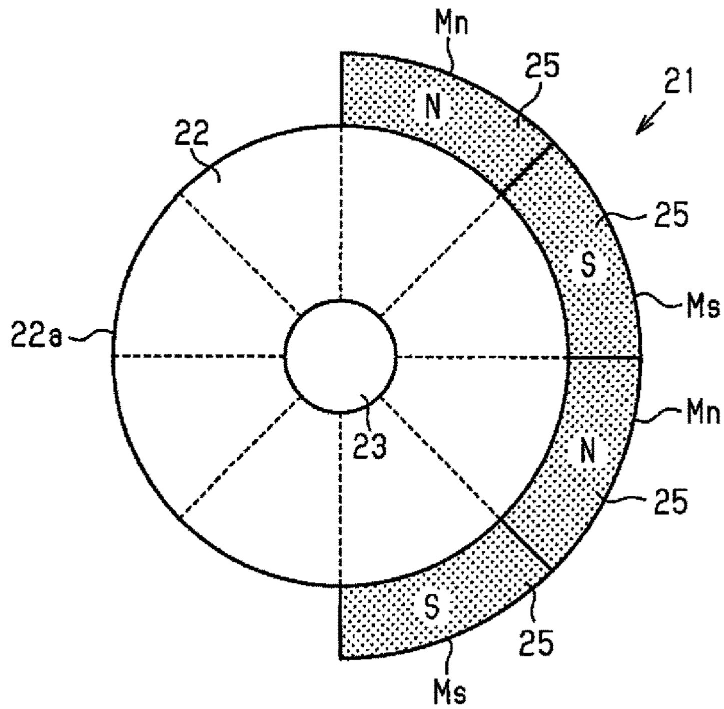
FIG. 6 is a plan view of a rotor having an SPM structure in a further example.

For example, as shown in FIG. 6, the magnet poles Mn and Ms (permanent magnets 25) may be arranged over one-half of the circumference of the rotor core 22 so that the N-poles and S-poles are located alternately, and the remaining one-half of the circumference may configured as the flux toleration portion (illustrated as exposed surface 22*a* in drawing). Such a configuration obtains advantage (1) of the above embodiment. In the drawing, the exposed surface 22*a* in the outer circumference of the rotor core 22 serves as a flux toleration portion. Instead, for example, a projection 24 formed integrally with the rotor core 22 like in the above embodiment may serve as the flux toleration portion.

The rotor 21 of the above embodiment has an SPM structure in which the permanent magnets 25, which form the magnet poles Mn and Ms, are fixed to the outer circumferential surface of the rotor core 22. However, for example, as shown in FIG. 7, an interior magnet structure (IPM structure) may be employed in which permanent magnets 25*a* are embedded and located inward from the outer circumferential surface 22*b* of the rotor core 22.

Figure 7:
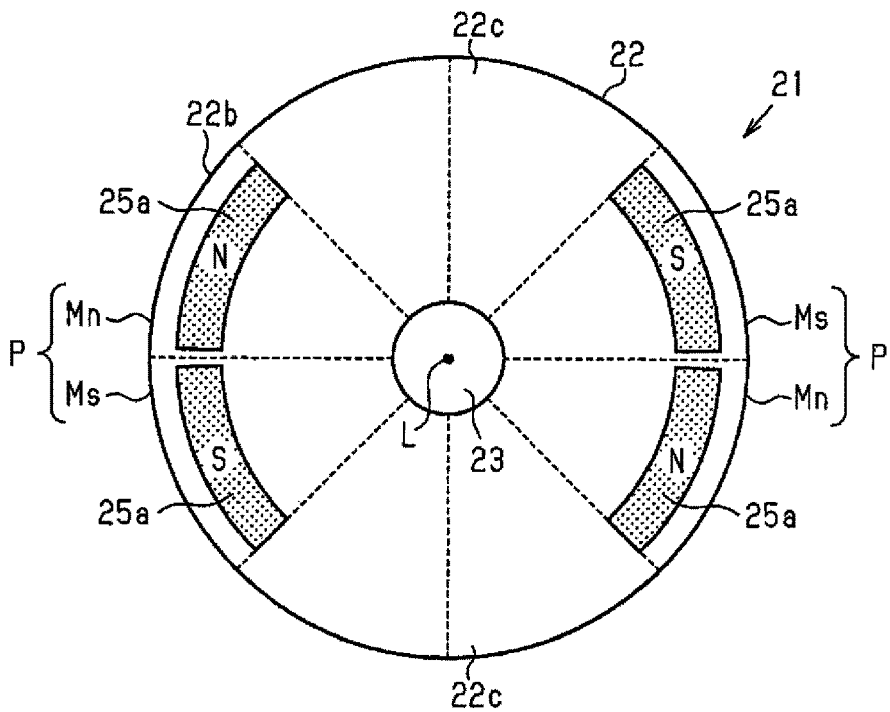
FIG. 7 is a plan view of a rotor having an IPM structure in a further example.

In the example of FIG. 7, the outer circumferential surface 22*b* of the rotor core 22 is circular in an axial view. Each of the permanent magnets 25*a* that form the magnet poles Mn and Ms has a radially outer surface and a radially inner surface that are arcuate and extend around the axis of the rotor core 22 (axis L of rotation shaft 23). In such a structure, portions of the rotor core 22 located between the magnet pole pairs P in the circumferential direction function as flux toleration portions 22*c* in a manner similar to the projections 24 of the above embodiment. Further, in this structure, the permanent magnets 25*a* are embedded in the rotor core 22. Thus, the magnet poles Mn and Ms are advantageous in that demagnetization of the permanent magnet 25*a* is reduced during field weakening control.

Figure 8:
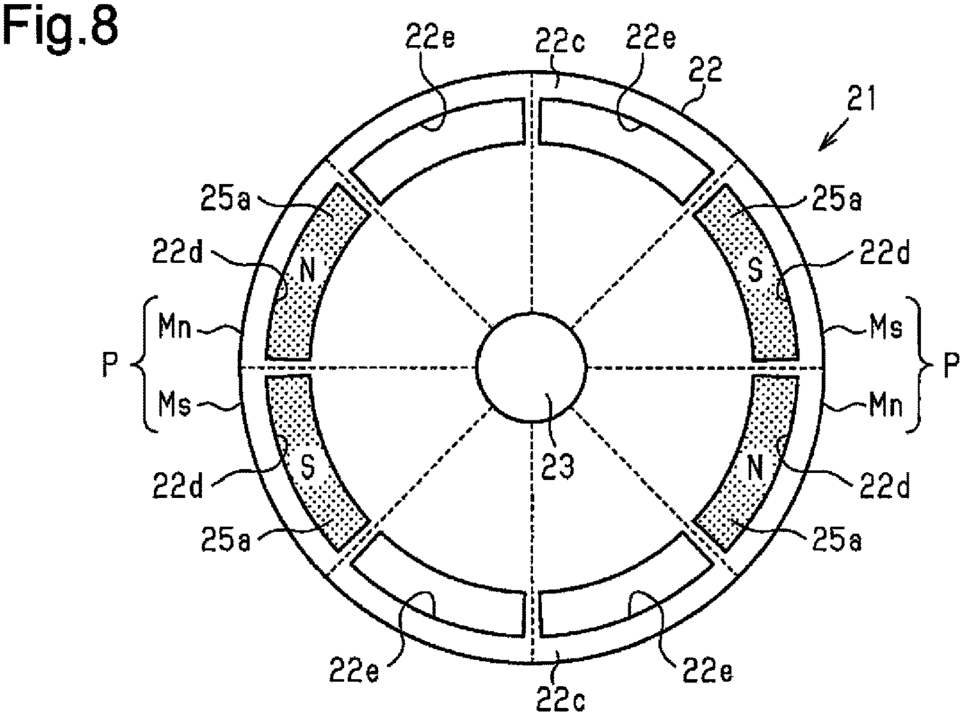
FIG. 8 is a plan view of a rotor having an IPM structure in a further example.

The rotor 21 shown in FIG. 8 differs from the structure shown in FIG. 7 in that the flux toleration portions 22*c* each include two magnet receptacles 22*e* that can receive the permanent magnets 25*a* and are identical in shape to magnet receptacles 22*d* of the magnet poles Mn and Ms. That is, the rotor core 22 includes eight magnet receptacles 22*d* and 22*e* that can receive the permanent magnets 25 and are arranged in the circumferential direction at equal angular intervals (45-degree intervals). Such a structure allows the rotor core 22 to be configured as an eight-pole IPM rotor by embedding the permanent magnets 25*a* in the magnet receptacles 22*e*. This improves the versatility of the rotor core 22.

Figure 9:
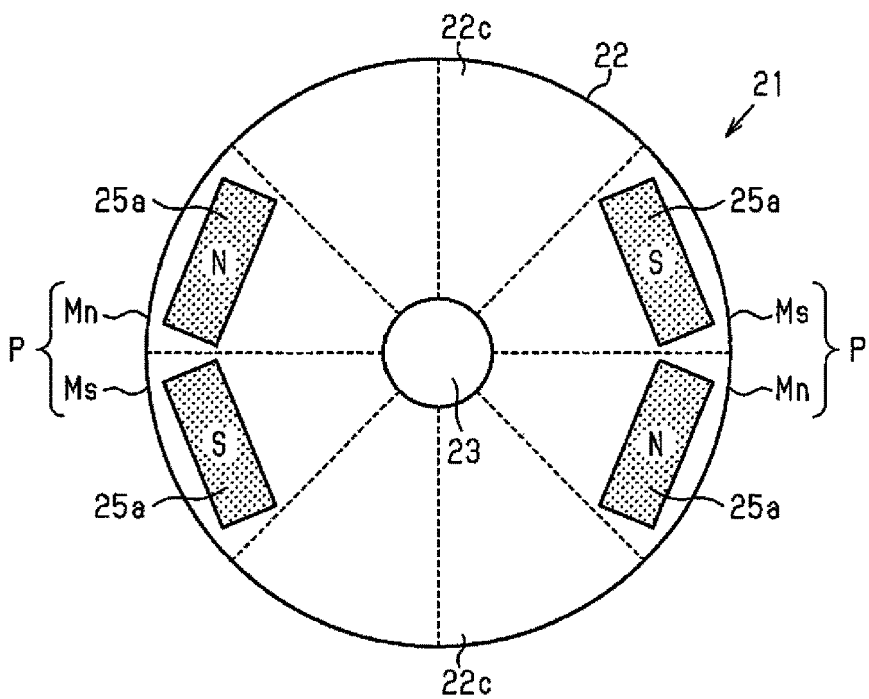
FIG. 9 is a plan view of a rotor having an IPM structure in a further example.

The rotor 21 shown in FIG. 9 differs from the structure shown in FIG. 7 in that the permanent magnets 25*a* are rectangular in an axial view. Each permanent magnet 25*a* includes a surface (radially inner surface) including a long side as viewed in the axial direction that is orthogonal to the radial direction of the rotor 21. Such a structure allows each permanent magnet 25*a* to have the shape of a simple parallelepiped. This facilitates formation of the permanent magnet 25*a* and lowers the magnet processing cost. In a structure in which the permanent magnets 25*a* are arcuate like in the example of FIG. 7, the magnet surface area can be increased as compared with when the permanent magnets 25*a* are rectangular in an axial view. This contributes to increasing the torque.

Figure 10:
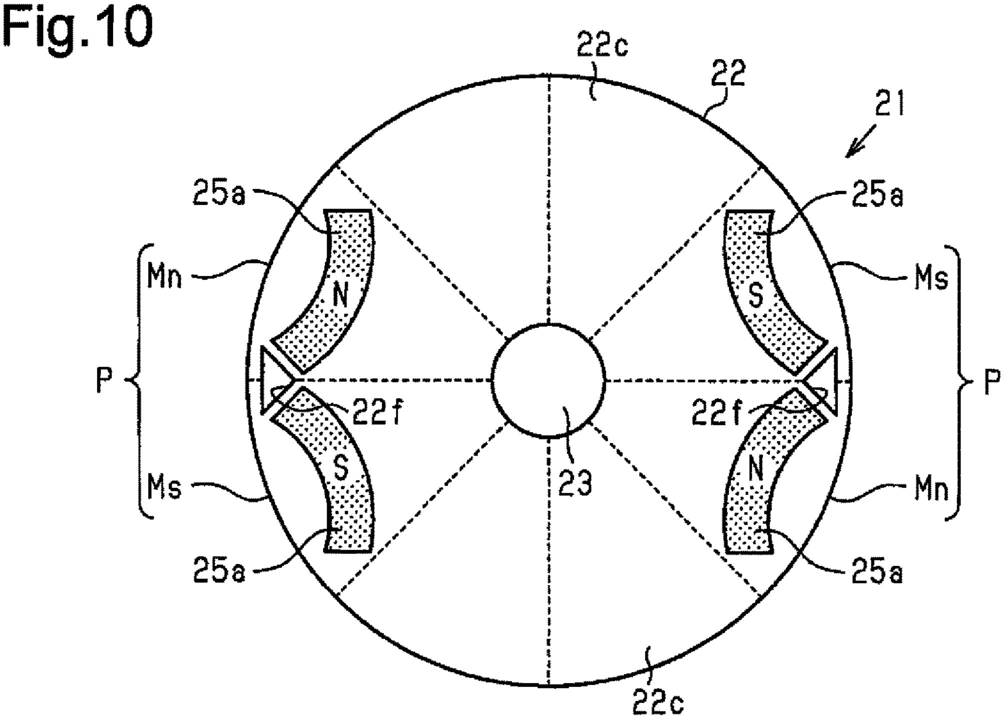
FIG. 10 is a plan view of a rotor having an IPM structure in a further example.

The rotor 21 shown in FIG. 10 differs from the structure shown in FIG. 7 in that the permanent magnets 25*a* are arcuate and bulged radially inward in an axial view. With such a structure, the portion of the rotor core 22 located at the radially outer side of the permanent magnets 25*a* (outer circumferential core portion 22*g*) is increased in volume. This allows the reluctance torque to be increased and contributes to further increasing the torque. In the example shown in FIG. 10, the rotor core 22 includes hollow portions 22*f* located between opposing ends of the permanent magnet 25*a* of a magnet pole Mn and the permanent magnet 25*a* of a magnet pole Mn (location corresponding to boundary of magnet poles Mn and Ms) to limit short-circuit flux between the permanent magnets 25*a*.

Figure 11:
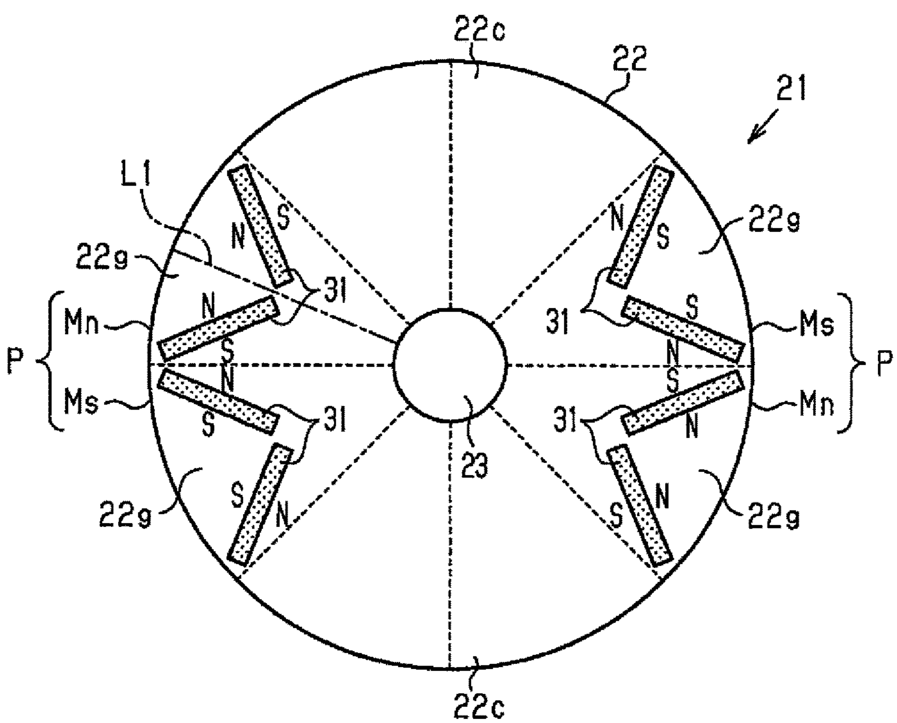
FIG. 11 is a plan view of a rotor having an IPM structure in a further example.

The rotor 21 shown in FIG. 11 differs from the structure shown in FIG. 10 in that the magnet poles Mn and Ms each include two parallelepiped permanent magnets 31. In each of the magnet poles Mn and Ms, the two permanent magnets 31 are arranged in the rotor core 22 in a substantially V-shaped layout that opens outward in the radial direction to be line-symmetric with respect to a pole center line (refer to line L1 in FIG. 11). The permanent magnets 31 in the N-magnet pole Mn are magnetized to form the N-poles at the opposing surfaces so that the outer circumferential sides of the magnet poles Mn are the N-poles. In the same manner, the permanent magnets 31 in the S-magnet pole Ms are magnetized to form the S-poles at the opposing surfaces so that the outer circumferential sides of the magnet poles Ms are the S-poles.

This structure also allows for an increase in the volume of the outer circumferential core portion 22*g* at the outer circumferential sides of the two permanent magnets 31 in each of the magnet poles Mn and Ms. Thus, the reluctance torque can be increased. This contributes to further increasing the reluctance torque. Further, in this structure, each permanent magnet 31 has the form of a simple parallelepiped. This lowers the magnet processing cost.

Figure 12:
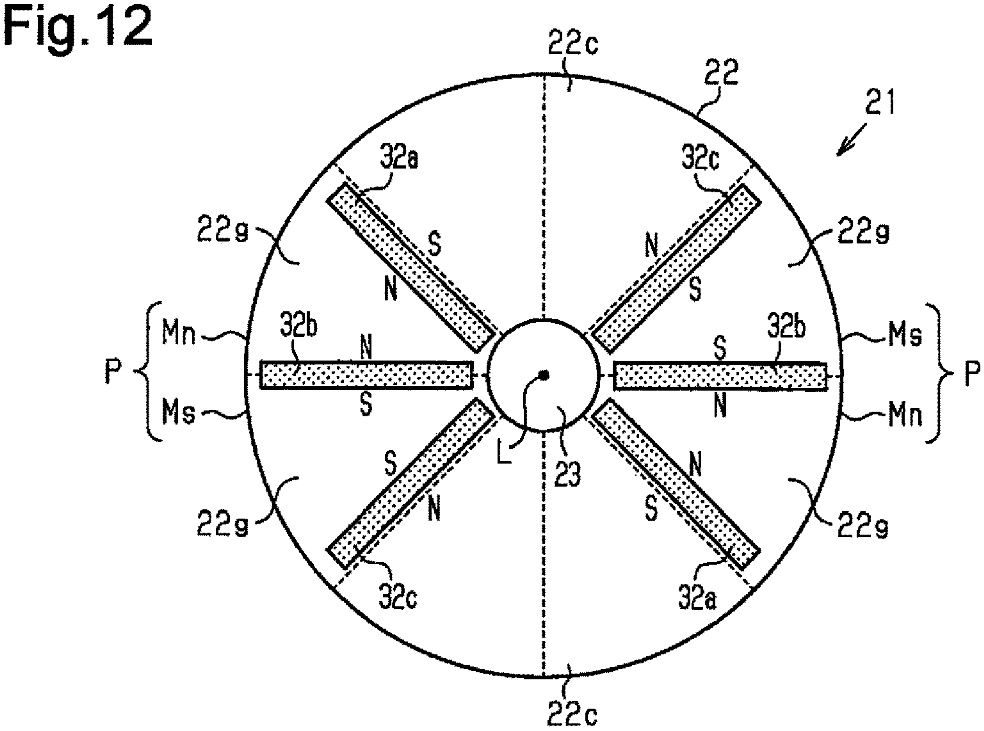
FIG. 12 is a plan view of a rotor having an IPM structure in a further example.

The rotor 21 shown in FIG. 12 differs from the structure shown in FIG. 11 in that the magnet pole pairs P each include three permanent magnets 32*a*, 32*b*, and 32*c* that are radially arranged about the axis L of the rotation shaft 23. The permanent magnets 32*a* to 32*c* are identical to one another in shape. In each of the magnet pole pairs P, the permanent magnet 32*b*, which is the middle one of the three permanent magnets 32*a* to 32*c*, extends in the radial direction along the boundary of the N-magnet pole Mn and the S-magnet pole Ms. The permanent magnet 32*b* is magnetized to have a magnetic orientation substantially extending in the circumferential direction of the rotor 21 and so that the portion closer to the magnet pole Mn in the circumferential direction functions as the N-pole and the portion closer to the magnet pole Ms in the circumferential direction functions the S-pole. Further, the permanent magnets 32*a* and 32*c* located at circumferentially opposite sides of the middle permanent magnet 32*b* are arranged to be line-symmetric with respect to the boundary (permanent magnet 32*b*). The open angle from the permanent magnet 32*b* to the permanent magnet 32*a* located toward the N-magnet pole Mn and the open angle from the permanent magnet 32*b* to the permanent magnet 32*c* located toward the S-magnet pole Ms are each set to substantially 45°. Further, the permanent magnet 32*a* is magnetized so that the surface opposing the middle permanent magnet 32*b* functions as the N-pole, and the permanent magnet 32*c* is magnetized so that the surface opposing the middle permanent magnet 32 functions as the S-pole.

With such a structure, the outer circumferential core portion 22*g* of each of the magnet poles Mn and Ms can be increased in volume. This allows the reluctance torque to be increased and contributes to further increasing the torque. Further, with this structure, the number of permanent magnets can be reduced from the structure of FIG. 11. Thus, the number of component can be reduced.

Figure 13:
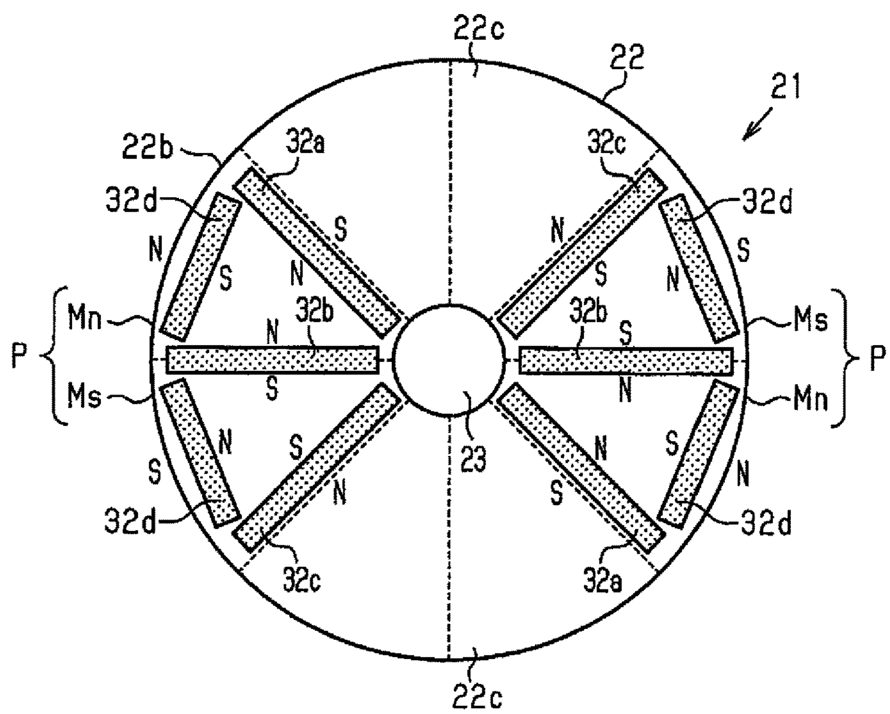
FIG. 13 is a plan view of a rotor having an IPM structure in a further example.

The rotor 21 shown in FIG. 13 differs from the structure shown in FIG. 12 in that the magnet poles Mn and Ms each include a permanent magnet 32*d* embedded in the rotor core 22 at a location proximate to the outer circumferential surface 22*b* (location proximate to radially outer ends of the permanent magnets 32*a* to 32*c*). The permanent magnets 32*d* are identical in shape and each have a parallelepiped form. The permanent magnet 32*d* of the N-magnet pole Mn is located between the radially outer ends of the permanent magnets 32*a* and 32*b* in the circumferential direction and magnetized so that the outer surface in the radial direction functions as the N-pole. Further, the permanent magnet 32*d* of the S-magnet pole Ms is located between the radially outer ends of the permanent magnets 32*b* and 32*c* in the circumferential direction and magnetized so that the outer surface in the radial direction functions as the S-pole. This structure contributes to increasing the torque of the motor 10.

Figure 14:
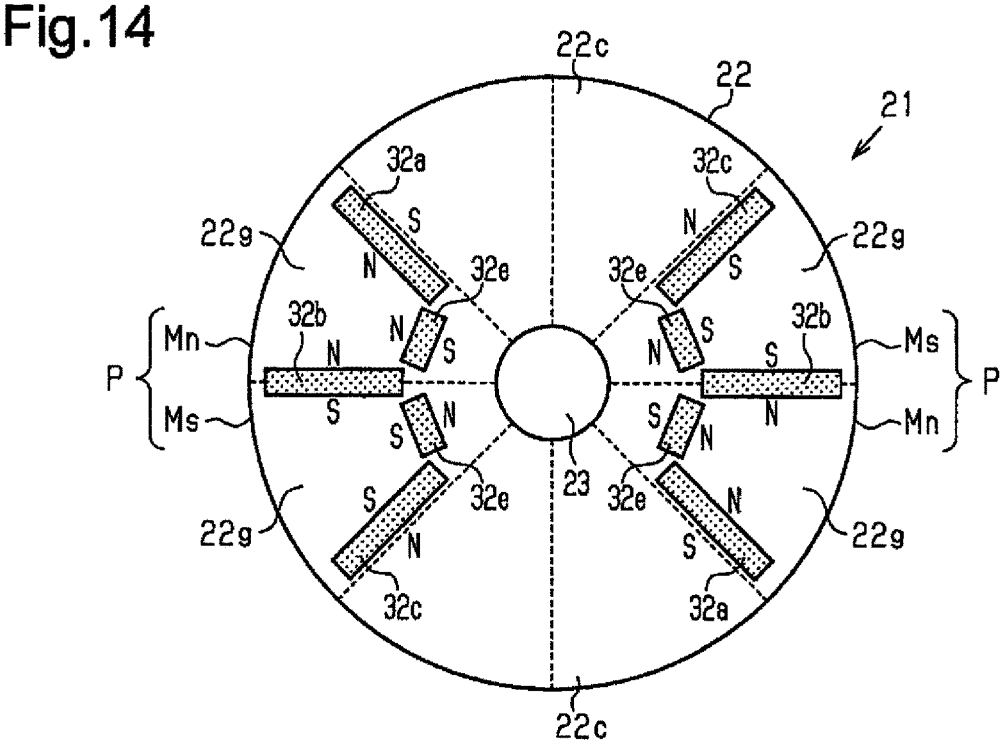
FIG. 14 is a plan view of a rotor having an IPM structure in a further example.

The rotor 21 shown in FIG. 14 differs from the structure shown in FIG. 12 in that the magnet poles Mn and Ms each include a permanent magnet 32*e* embedded in the rotor core 22 at a location proximate to the radially inner ends of the permanent magnets 32*a* to 32*c*. The permanent magnets 32*e* are identical in shape and have a parallelepiped form. The permanent magnet 32*e* of the N-magnet pole Mn is located between the radially inner ends of the permanent magnets 32*a* and 32*b* in the circumferential direction and magnetized so that the outer surface in the radial direction functions as the N-pole. Further, the permanent magnet 32*e* of the S-magnet pole Ms is located between the radially inner ends of the permanent magnet 32*b* and 32*c* and magnetized so that the outer surface in the radial direction functions as the S-pole. With this structure, the addition of the permanent magnets 32*e* increases the torque and increases the volume for the outer circumferential core portion 22*g* in each of the magnet poles Mn and Ms. Thus, the reluctance torque can be obtained. Further, with this structure, in comparison with the structure shown in FIG. 13, the magnet torque of each of the magnet poles Mn and Ms is decreased. However, the induced voltage generated at the windings 13 during rotor rotation can be reduced accordingly.

Figure 15:
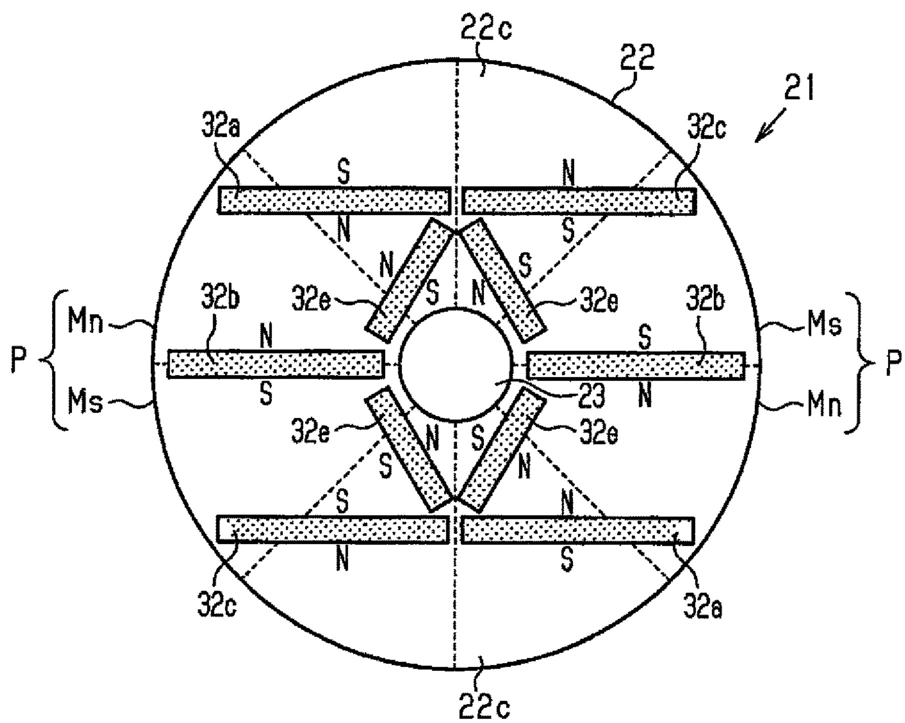
FIG. 15 is a plan view of a rotor having an IPM structure in a further example.

The rotor 21 shown in FIG. 15 differs from the structure shown in FIG. 14 in that in each of the magnet pole pairs P, the N-pole and S-pole permanent magnets 32*a* and 32*c* are arranged parallel to the permanent magnet 32*b* lying along the pole boundary. This structure increases the size (magnet surface area) of the permanent magnets 32*a* to 32*c* and the size (magnet surface area) of the permanent magnets 32*e* arranged between the inner ends of the permanent magnets 32*a* to 32*c*. This contributes to increasing the torque. In the structure shown in FIG. 15, a hollow portion (slit) may be formed instead of each permanent magnet 32*e* embedded in the rotor core 22.

In the above embodiment, the total number of the magnet poles Mn and Ms in the rotor 21 is four, and the number (slot number) of the windings 13 of the stator 11 is twelve. However, the total number of the magnet poles Mn and Ms and the number of the windings 13 may be changed in accordance with the structure. For example, the total number of the magnet poles Mn and Ms and the number of the windings 13 may be changed so that the total number of the magnet poles Mn and Ms and the number of the windings 13 have a relationship of n:3 (where n is an integer of 2 or larger). When the total number of the magnet poles Mn and Ms is an even number like in the above embodiment, the number of magnet poles Mn can be the same as the number of magnet poles Ms. This allows for a structure that is well-balanced in magnetic terms.

Further, the total number of the magnet poles Mn and Ms and the number of the windings 13 does not necessarily have to be in a relationship of n:3n (where n is an integer of 2 or greater). For example, the total number of the magnet poles Mn and Ms and the number of the windings 13 may have a relationship of 5:12, 7:12, or the like.

Figure 16:
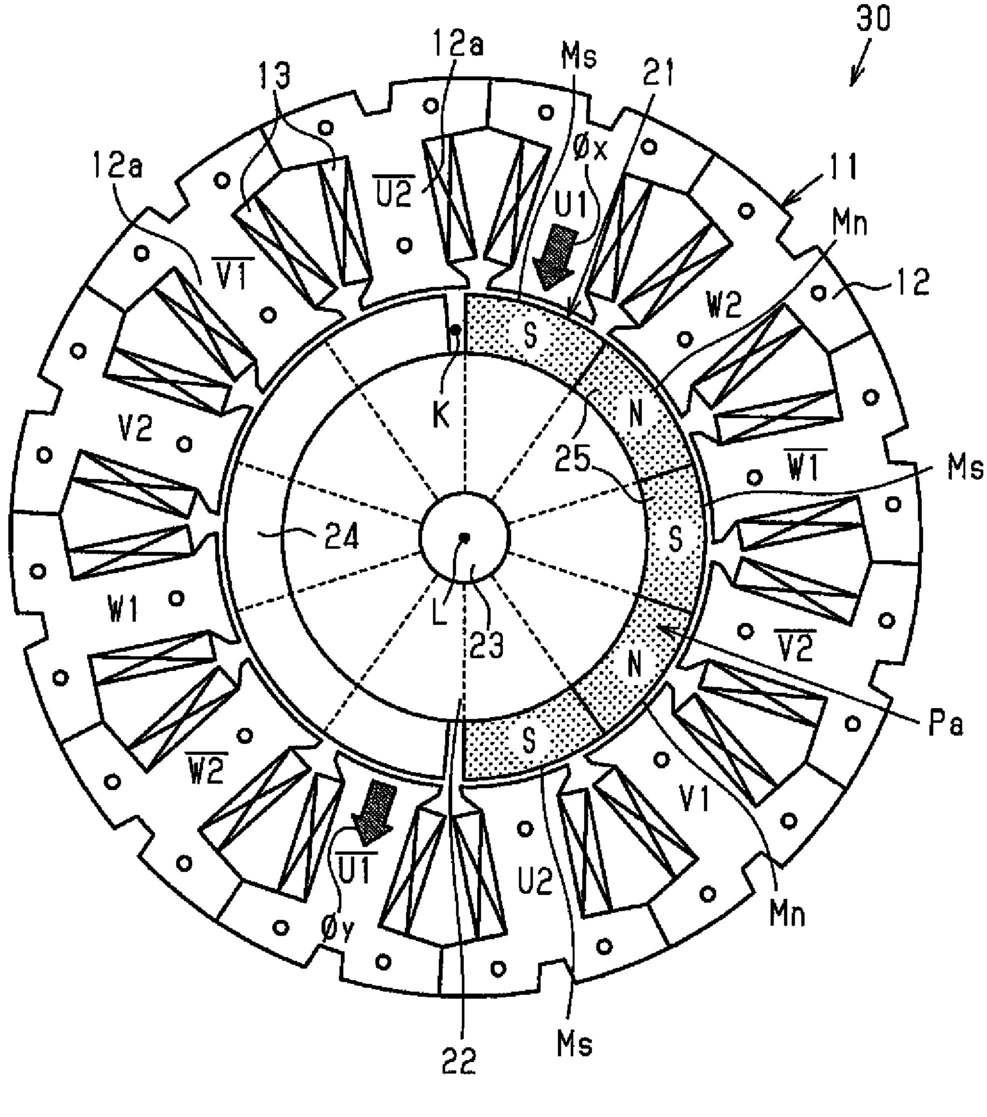
FIG. 16 is a plan view of a motor in a further example.

FIG. 16 shows one example of a motor 30 in which the total number of the magnet poles Mn and Ms and the number of the windings 13 have a relationship of 5:1. In the example of FIG. 16, same reference numerals are given to those components that are the same as the corresponding components of the above embodiment. Such components will not be described in detail. The description hereafter will focus on differences from the above embodiment.

In the motor 30 shown in FIG. 16, the twelve windings 13 of the stator 11 are classified in accordance with the supplied drive currents of three phases (U-phase, V-phase, and W-phase) and indicated in FIG. 16 in order in the counter-clockwise direction as U1, bar U2, bar V1, V2, W1, bar W2, bar U1, U2, V1, bar V2, bar W1, and W2. The U-phase windings U1 and U2, the V-phase windings V1 and V2, and the W-phase windings W1 and W2 are formed by forward windings. The U-phase windings bar U1 and bar U2, the V-phase winding bar V1 and bar V2, and the W-phase windings bar W1 and bar W2 are formed by reverse windings. The U-phase windings U1 and bar U1 are arranged at 180-degree opposing positions. In the same manner, the U-phase windings U2 and bar U2 are arranged at 180-degree opposing positions. The same applies to the other phases (V-phase and W-phase).

The U-phase windings U1, U2, bar U1, and bar U2 are connected in series. In the same manner, the V-phase windings V1, V2, bar V1, and bar V2 are connected in series, The W-phase windings W1, W2, bar W1, and bar W2 are connected in series. The U-phase windings U1, U2, bar U1, bar U2 are supplied with a U-phase drive current. This constantly excites the U-phased windings bar U1 and bar U2, which are reverse windings, with an inverted polarity (inverted phase) with respect to the U-phase windings U1 and U2, which are forward windings. However, the excitation timing is the same. The same applies to the other phases (V-phase and W-phase). The windings of each phase are supplied with drive current that is set assuming that the pole number of the rotor 21 is two times the number of the magnet poles Mn and Ms (i.e., 10 poles in the present example).

The outer circumferential portion of the rotor 21 of the motor 30 includes a single pole set Pa, in which three magnet poles Ms and two magnet poles Mn are alternately arranged next to one another in the circumferential direction, and a single projection 24 of the rotor core 22.

The magnet poles Mn and Ms (permanent magnets 25) are set to have an equal open angle about the axis L. Further, the open angle of the magnet poles Mn and Ms (permanent magnet 25) is set to (360/2n)°, where n represents the total number of the magnet poles Mn and Ms (number of permanent magnets 25). In the permanent example, the total number of the magnet poles Mn and Ms is 5. Thus, the open angle of the magnet poles Mn and Ms (permanent magnet 25) is set to 36°, and the open angle of the pole set Pa is 180°.

More specifically, in the present example, one half of the outer circumference of the rotor 21 includes the pole set Pa, and the other half includes the projection 24 that is formed to have an open angle of substantially 180°. Thus, the rotor 21 is formed so that the projection 24 is located 180° opposite to the magnet poles Mn and Ms. The open angle of the projection 24 of the rotor core 22 is smaller than 180° for an amount corresponding to the gaps K extending from the magnet poles Ms (permanent magnets 25) that are adjacent in the circumferential direction.

In the above configuration, during high-speed rotation of the rotor 21 (during field weakening control), for example, when the U-phase winding U1 is opposed in the radial direction to the S-magnet pole Ms, the projection 24 of the rotor core 22 is opposed in the radial direction to the U-phase winding bar U1 (refer to FIG. 16) at the opposite side in the circumferential direction. That is, the magnet pole Ms and the projection 24 are simultaneously opposed to the U-phase windings U1 and bar U1 that are excited in inverted phases (synchronously).

In this case, the U-phase windings U1 and bar U1 are supplied with field weakening current. However, in the U-phase winding U1, the flux of the opposing magnet pole Ms (flux toward radially inner side) exceeds the flux linkage (flux linkage toward radially outer side), and the flux linkage $\phi x$ is generated passing through the U-phase winding U1 toward the radially inner side.

With regard to the U-phase winding bar U1, the opposing portion of the rotor 21 is the projection 24 of the rotor core 22. Thus, the flux linkage $\phi y$ resulting from the field weakening current is not eliminated, and the flux linkage $\phi y$ passes through the U-phase winding bar U1 toward the radially outer side. That is, the projection 24 of the rotor core 22 opposing the U-phase winding bar U1 serves as the flux toleration portion that tolerates the generation of the flux linkage $\phi y$ resulting from the field weakening current. In this manner, the flux linkage $\phi y$ is generated at the U-phase winding bar U1. The flux linkage $\phi y$ has a phase inverted from the flux linkage $\phi x$ generated at the U-phase winding U1 by the magnet pole Ms. As a result, the induced voltage generated at the U-phase winding bar U1 by the flux linkage $\phi y$ has an inverted polarity (inverted phase) with respect to the induced voltage generated at the U-phase winding U1 by the flux linkage $\phi x$. This reduces the combined induced voltage at the U-phase windings U1 and bar U1. In this manner, the combined induced voltage of each phase is reduced. Thus, the rotation speed of the motor 30 can be increased.

The number of the magnet poles Mn and the number of the magnet poles Ms are not limited in the manner shown in the example of FIG. 16. For example, there may be three magnet poles Mn and two magnet poles Ms Further, the arrangement of the magnet poles Mn and Ms and the projections 24 in the rotor 21 is not limited to the arrangement of the example shown in FIG. 16 and can be changed to the structure shown in, for example, FIG. 17 as long as the projection 24 is located at the circumferentially opposite side of the magnet poles Mn and Ms.

Figure 17:
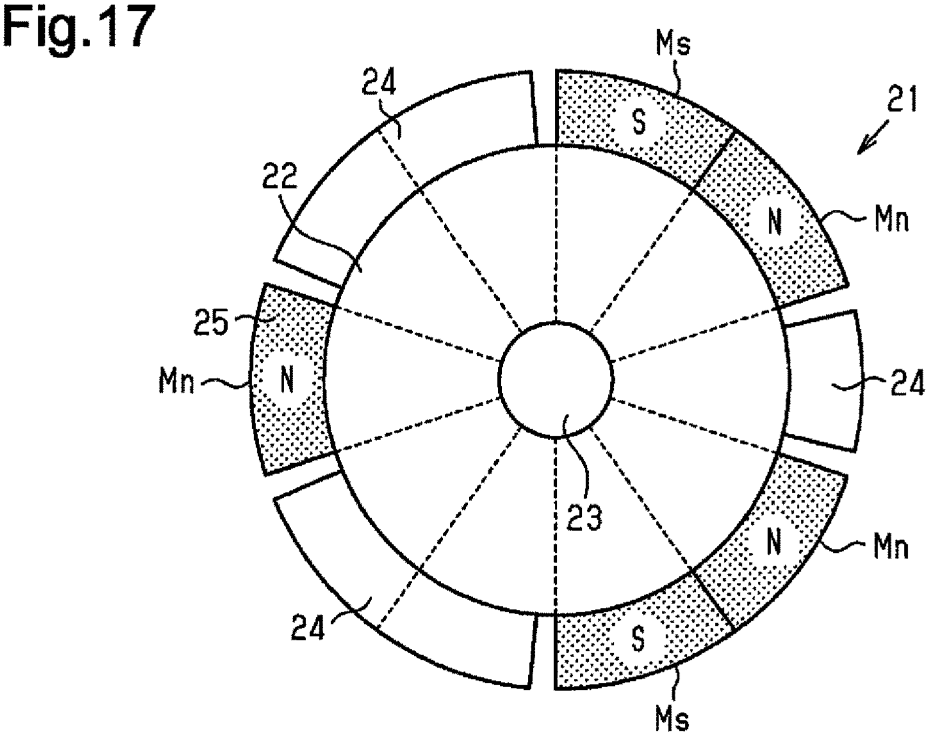
FIG. 17 is a plan view of a rotor in a further example.

In the structure of FIG. 17, a projection 24 is formed in lieu of the middle magnet pole Ms in the pole set Pa of the structure shown in FIG. 16, and a magnet pole Mn (N-pole permanent magnet 25) is arranged at the circumferentially opposite side of the projection 24. This structure has the same advantages as the structure shown in FIG. 16. Further, in comparison with the structure shown in FIG. 16, the rotor 21 is well-balanced in magnetic and mechanical terms.

In the stator 11, the U-phase windings U1, U2, bar U1, and bar U2 do not all have to be connected in series. Further, the windings U1 and bar U1 may form a series-connected pair that is separate from the series-connected pair of the windings U2 and bar U2. The same changes may be made for the V-phase and the W-phase.

Further, FIG. 16 shows an example in which the total number of the magnet poles Mn and Ms and the number of the windings 13 have a 5:12 relationship. However, a structure having a 7:12 relationship is also applicable. Further, a structure is applicable in which the total number of the magnet poles Mn and Ms and the number of the windings 13 in 5:12 (or 7:12) are multiplied by same number.

Figure 18:
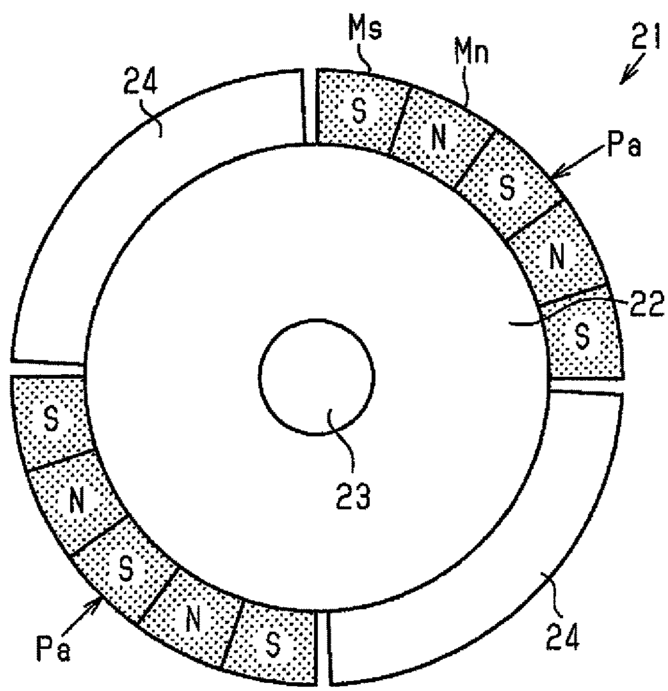
FIG. 18 is a plan view of a rotor in a further example.

FIG. 18 shows one example of the rotor 21 in which the total number of the magnet poles Mn and Ms and the number of the windings 13 have a 10:24 relationship. In this example, pole sets Pa, in which the N-magnet poles Mn and the S-magnet poles Ms are alternately arranged in the circumferential direction, and projections 24 of the rotor core 22 are alternately arranged in the circumferential direction each extending over an open angle (occupied angle) of substantially 90°. In this manner, the pole sets Pa and the projections 24 are arranged in a well-balanced manner in the circumferential direction. Thus, the rotor 21 is well-balanced in magnetic and mechanical terms.

Figure 19:
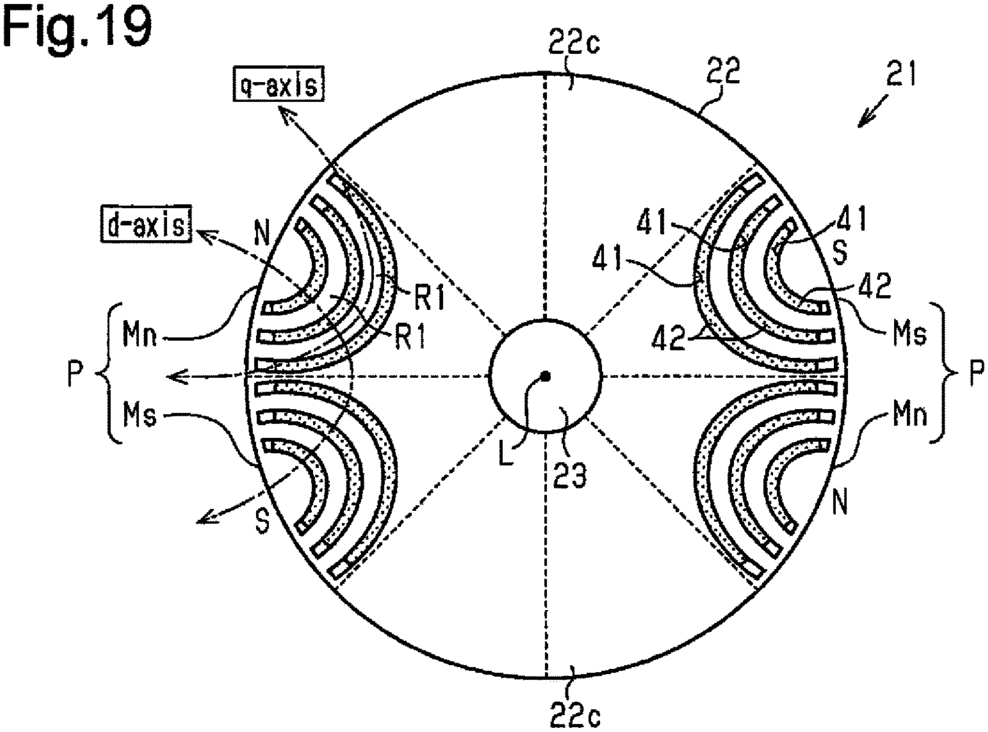
FIG. 19 is a plan view of a rotor in a further example.

The rotor 21 of the above embodiment may have an interior magnet structure (IPM structure) as shown in FIG. 19.

FIG. 19 shows an example in which the magnet poles Mn and Ms include magnet receptacles 41 formed in the rotor core 22. Permanent magnets 42 are received in and fixed to the magnet receptacles 41. The magnet poles Mn and Ms each include three magnet receptacles 41 arranged next to one another in the radial direction, with each magnet receptacle 41 accommodating a permanent magnet 42. Each magnet receptacle 41 has a curved form and is bulged toward the center (axis L) of the rotor 21 as viewed in the axial direction. Further, each magnet receptacle 41 has a curved form in which the center position in the circumferential direction of the magnet poles Mn and Ms is closest to the axis L. The permanent magnet 42 arranged in each magnet receptacle 41 also has a curved formed that is in conformance with the form of the magnet receptacle 41. Each permanent magnet 42 in the N-magnet poles Mn is magnetized so that the portion at the inner side of the curve (radially outer side of rotor) functions as the N-pole, and each permanent magnet 42 in the S-magnet poles Ms is magnetized so that the portion at the inner side of the curve (radially outer side of rotor) functions as the S-pole. In the structure shown in FIG. 19, the number of the magnet receptacles 41 (permanent magnets 42) arranged next to one another in the radial direction in each of the magnet poles Mn and Ms is three. However, the number may be two, four, or greater than four.

With this structure, in each of the magnet poles Mn and Ms, portions of the rotor core 22 between the magnet receptacles 41 (inter-receptacle portion R1) form q-axis magnetic paths. This sufficiently increases the q-axis inductance. Further, in d-axis magnetic paths, the magnet receptacles 41 (and permanent magnets 42) produce magnetic resistance that sufficiently decreases the d-axis inductance. This increases the difference between the q-axis inductance and the d-axis inductance (salient-pole ratio). Thus, the reluctance torque can be increased, and the torque can be further increased.

In the structure of FIG. 19, preferably, the permanent magnets 42 are, for example, configured by, for example, neodymium magnets, samarium-cobalt (SmCo) magnets, SmFeN magnets, ferrite magnets, alnico magnets, or the like. Further, the permanent magnets 42 arranged next to one another in the radial direction in each of the magnet poles Mn and Ms preferably have different magnetic properties (magnetic coercive force or residual flux density). For example, in order to limit demagnetization, a large magnetic coercive force can be set for the permanent magnet 42 located closer to the outer circumference that is apt to being affected by external magnetic fields. In contrast, a small magnetic coercive force (or large residual flux density) can be set for the permanent magnet 42 located closer to the inner circumference since the effect of external magnetic fields is limited. Accordingly, for the permanent magnets 42 arranged next to one another in the radial direction, it is preferred that a larger magnetic coercive force be set for those located closer to the outer circumference.

Figure 20:
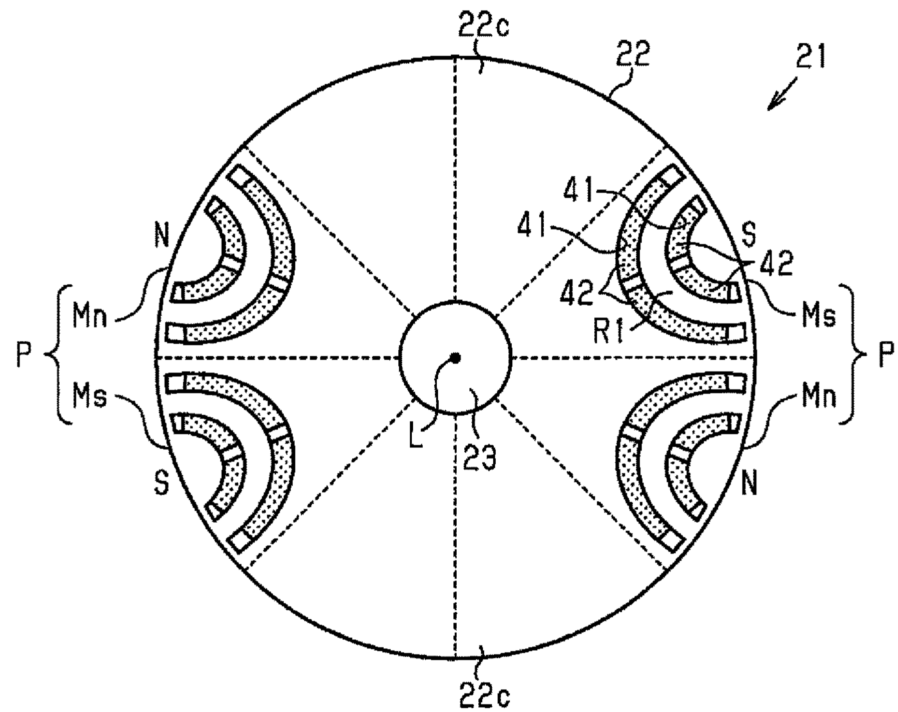
FIG. 20 is a plan view of a rotor in a further example.

In the example of FIG. 19, each magnet receptacle 41 includes a single permanent magnet 42. However, for example, as shown in FIG. 20, the permanent magnet 42 received in each magnet receptacle 41 may be divided into a plurality of (two in the drawing) segments in the circumferential direction. This structure reduces the size of each permanent magnet 42 and facilitates the formation of each permanent magnet 42. In the structure shown in FIG. 20, the number of magnet receptacles 41 (permanent magnets 42) arranged next to one another in the radial direction in each of the magnet poles Mn and Ms is two. Instead, the number may be one, three, or greater than three.

Figure 21:
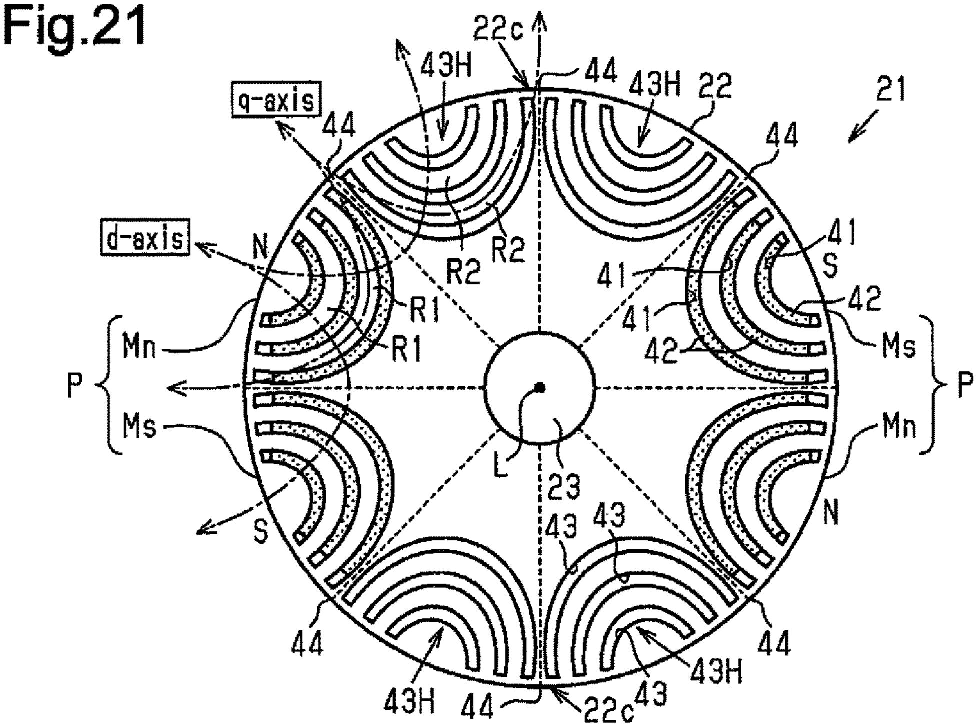
FIG. 21 is a plan view of a rotor in a further example.

As shown in FIG. 21, slits 43 may be formed in the rotor core 22 at portions located between the magnet pole pairs P in the circumferential direction (flux toleration portions 22*c*) so that the flux rectifying effect of the slits 43 result in the flux toleration portions 22*c* acting as salient-poles 44.

In the structure of FIG. 21, the occupied angle of the two magnet pole pairs P is substantially 180° in the circumferential direction of the rotor core 22, and the remaining range functions as the flux toleration portions 22*c* where magnets are not arranged. More specifically, the rotor core 22 includes two magnet pole pairs P and two flux toleration portions 22*c* that are alternately arranged in the circumferential direction in intervals of substantially 90°. The magnet layout in each of the magnet poles Mn and Ms is the same as the structure shown in FIG. 19.

Each flux toleration portion 22*c* includes two slit groups 43H, each formed by a plurality of (three in the example of FIG. 21) slits 43 arranged next to one another in the radial direction. The slits 43 of each slit group 43H are each curved and bulged toward the center of the rotor 21 (axis L) as viewed in the axial direction. In the example shown in FIG. 21, the slits 43 of each slit group 43H are identical in shape to the magnet receptacles 41 in each of the magnet poles Mn and Ms. Further, each slit group 43H is formed so that the peaks (portion closest to axis L in axial view) of the curves of the slits 43 are aligned in the radial direction. The circumferential center (curve peak) of each slit group 43H and the circumferential center of each of the magnet poles Mn and Ms are located at equal intervals in the circumferential direction (equal intervals of 45° in illustrated example). In the structure shown in FIG. 21, the number of the slits 43 in each slit group 43H is three but instead may be two, four, or greater than four.

With such a structure, portions of the rotor core 22 between the slits 43 (inter-slit portions R2) form q-axis magnetic paths. This sufficiently increases the q-axis inductance. Further, in d-axis magnetic paths, the slits 43 produce magnetic resistance that sufficiently decreases the d-axis inductance. Accordingly, the difference between the q-axis inductance and the d-axis inductance (salient-pole ratio) can be increased. This produces the salient-poles 44 at the circumferentially center position of each flux toleration portion 22*c* (i.e., center position between slit groups 43H that are adjacent to each other in circumferential direction) and at the circumferentially center position between each slit group 43H and the adjacent one of the magnet poles Mn and Ms (magnet receptacles 41) in the circumferential direction. Thus, reluctance torque can be obtained at each of the salient-poles 44, and the torque can be further increased. The flux rectifying effect of the slits 43 in the rotor core 22 result in the salient-poles 44 acting as poles. The salient-poles 44 are not magnet poles of permanent magnets. Thus, even though the flux toleration portions 22*c* include the salient-poles 44, the flux toleration portions 22*c* function to tolerate the flux linkage ϕy (refer to FIG. 1) generated by a field weakening current.

In the example shown in FIG. 21, the magnet poles Mn and Ms have a magnet configuration that conforms to the configuration shown in FIG. 19 but instead may have a configuration (IPM structure) like those shown in FIGS. 20, 7, and 9 to 14 or a configuration (SPM structure) like that of the above embodiment (FIG. 1).

Figure 22:
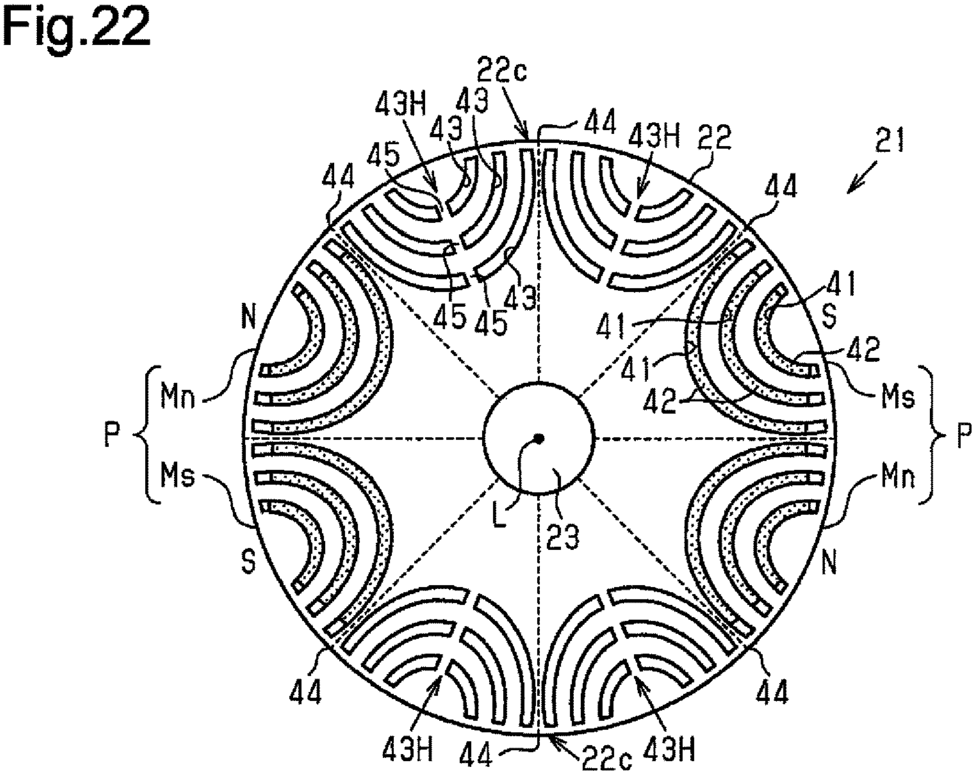
FIG. 22 is a plan view of a rotor in a further example.

The shape of the slits 43 in each slit group 43H of FIG. 21 may be changed as shown in FIG. 22. In the structure shown in FIG. 22, each slit 43 is divided into segments at the circumferentially center position of each slit group 43H. More specifically, the rotor core 22 includes a connection portion 45 formed at the circumferentially center position of each slit group 43H to connect a core portion at radially opposite sides of each slit 43. With the structure of FIG. 22, the flux linkage ϕy resulting from a field weakening current can be increased as compared with the structure shown in FIG. 22. This is advantageous for increasing the rotation speed.

Figure 23:
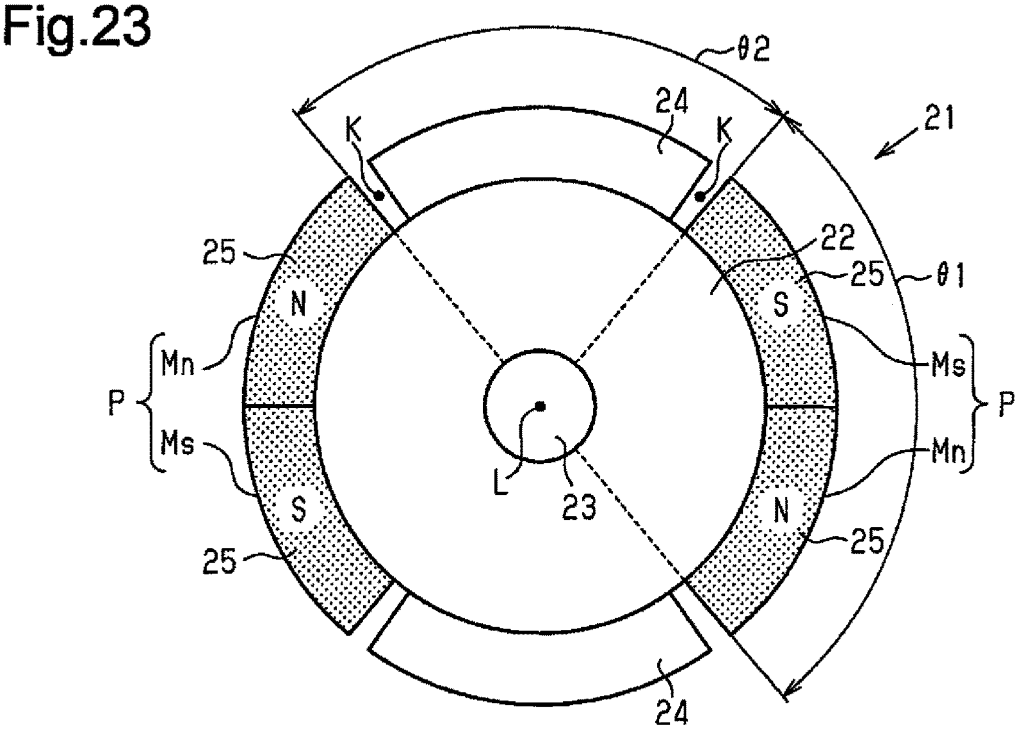
FIG. 23 is a plan view of a rotor in a further example.

As shown in FIG. 23, the open angle θ1 (occupied angle) of a magnet pole pair P formed by the magnet poles Mn and Ms that are adjacent to each other in the circumferential direction may be larger than the open angle θ2 (occupied angle) of a flux toleration portion of the rotor core 22. The open angle θ1 of the magnet pole pair P is the open angle from the circumferential end of the N-pole permanent magnet 25 (magnet pole Mn) that is not adjacent to an S-pole permanent magnet 25 (magnet pole Ms) to the circumferential end of the S-pole permanent magnet 25 that is not adjacent to an N-pole permanent magnet 25. Further, the open angle θ2 of the flux toleration portion is the open angle including a projection 24 of the rotor core 22 and the gaps K located at the two sides of the projection 24. In the structure of the present example that includes two magnet pole pairs P and two projections 24 (flux toleration portions), θ1+θ2=180 (degrees) is satisfied. In such a structure, the open angle θ1 of the magnet pole pair P is larger than the open angle θ2 of the flux toleration portion of the rotor core 22. This is advantageous for increasing the torque.

Figure 24:
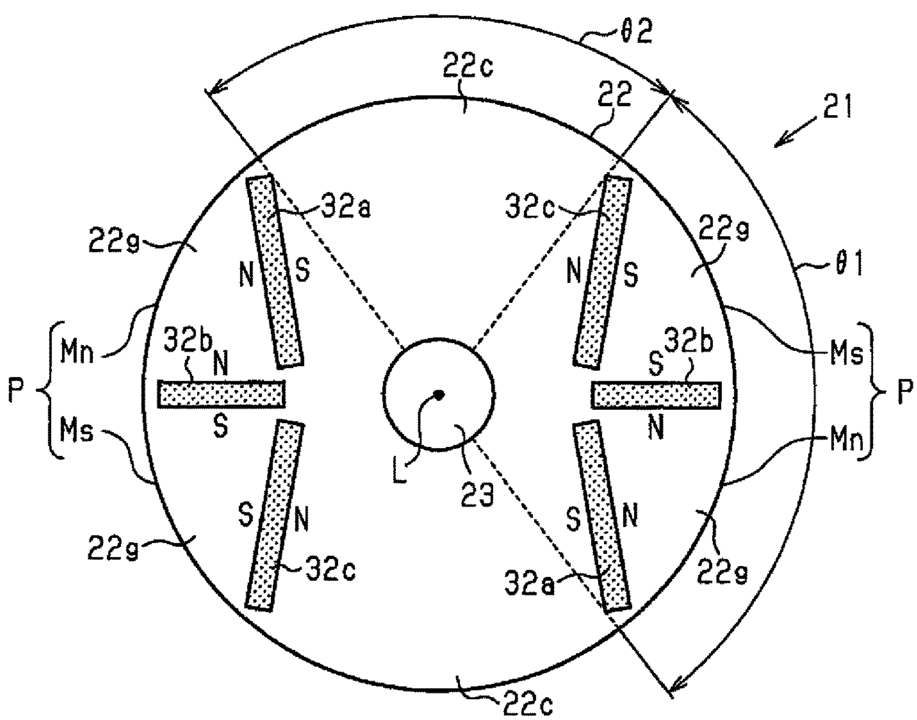
FIG. 24 is a plan view of a rotor in a further example.

In the structure shown in FIG. 23, the present invention is applied to an SPM structure in which the permanent magnets 25 forming the magnet poles Mn and Ms are fixed to the outer circumferential surface of the rotor core 22. Instead, the present invention may be applied to an IPM structure as shown in FIG. 24. The rotor 21 shown in FIG. 24 changes the shape and layout of the permanent magnets 32*a*, 32*b*, and 32*c* shown in FIG. 12. The open angle θ1 of a magnet pole pair P (permanent magnets 32*a*, 32*b*, 32*c*) is greater than the open angle θ2 of a flux toleration portion 22*c*. This is advantageous for increasing the torque. FIG. 23 shows an example in which the present invention is applied to the IPM structure of FIG. 12. The present invention may also be applied to the IPM structures shown in FIGS. 7 to 11, 13, 14, and the like.

Figure 25:
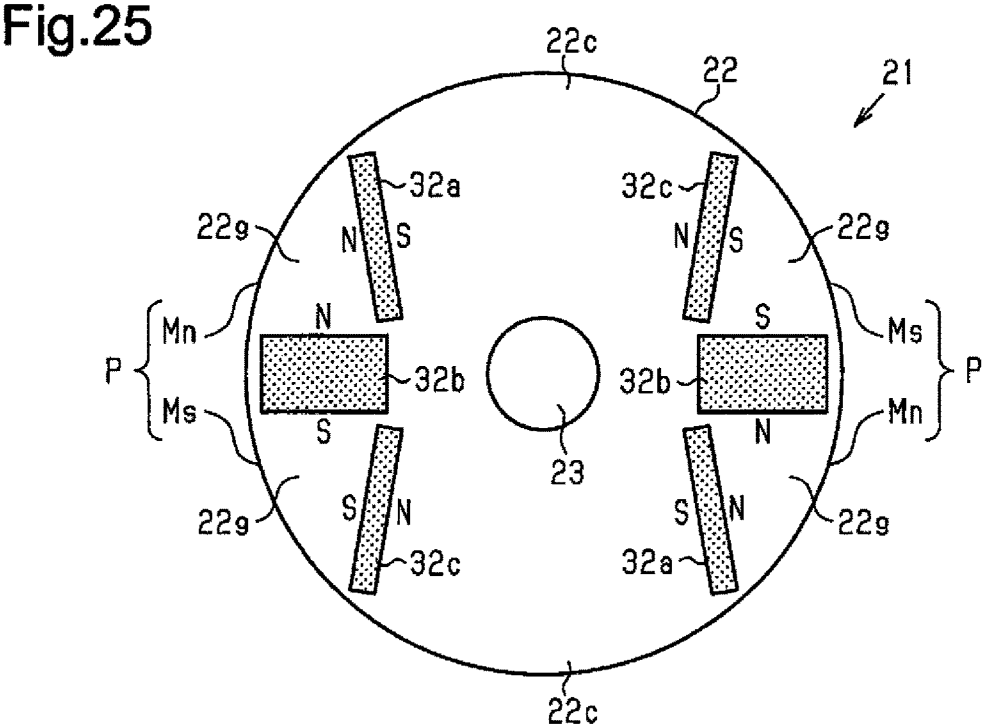
FIG. 25 is a plan view of a rotor in a further example.
Figure 26:
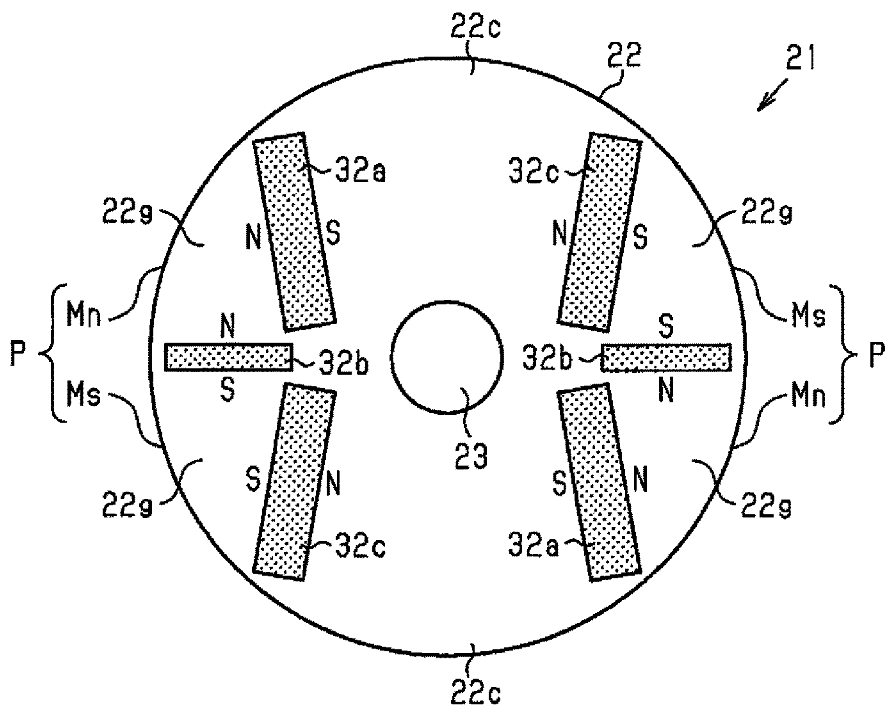
FIG. 26 is a plan view of a rotor in a further example.

Further, in the structure shown in FIG. 24, the permanent magnets 32*a*, 32*b*, and 32*c* all have the same thickness (width in direction parallel to short side in axial view). As shown in FIG. 25, in each magnet pole pair P, the thickness of the permanent magnet 32*b*, which is the middle one of the permanent magnets 32*a* to 32*c*, may be greater than the thickness of the other permanent magnets 32*a* and 32*c*. In contrast, as shown in FIG. 26, the thickness of the permanent magnets 32*a* and 32*c* may be greater than the thickness of the middle permanent magnet 32*b*. In such manner, the permanent magnets 32*a*, 32*b*, and 32*c* may differ from one another in thickness. This allows for easy adjustment of the motor output properties.

In the above embodiment, the projections 24, which define the flux toleration portions, are formed integrally with the rotor core 22. In other words, the rotor core 22 is an integral component that includes the projections 24. Instead, the projections 24 may be separate bodies.

Figure 27:
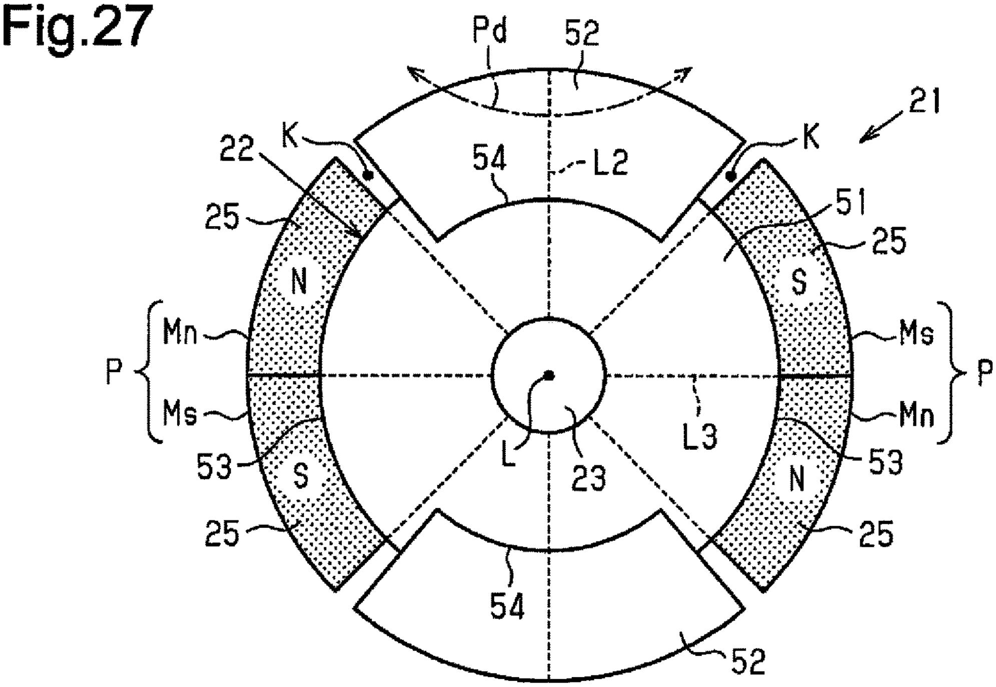
FIG. 27 is a plan view of a rotor in a further example.

For example, in the structure shown in FIG. 27, the rotor core 22 includes a core body 51 and separate core members 52. The core body 51 is, for example, generally cylindrical and formed from iron material such as a cold rolled steel sheet (SPCC). The rotation shaft 23 is fixed to the central portion of the core body 51. The outer circumferential surface of the core body 51 includes two first fixing portions 53, to which the permanent magnets 25 are fixed, and two second fixing portions 54, to which the separate core members 52 are fixed.

An N-pole permanent magnet 25 and an S-pole permanent magnet 25, which are adjacent to each other in the circumferential direction, are fixed to each first fixing portion 53 of the core body 51. This forms the magnet pole pair P (N-magnet pole Mn and S-magnet pole Ms) on each first fixing portion 53 of the core body 51.

Each second fixing portion 54 is recessed inward in the radial direction from the outer circumferential surface of the core body 51 between the first fixing portions 53 in the circumferential direction. The separate core members 52 are fixed to the second fixing portion 54 through press-fitting or by an adhesive agent. Each separate core member 52 has a sectoral form extending about the axis L of the rotation shaft 23. Further, each separate core members 52 is formed by a material (e.g., amorphous metal, permalloy, or the like) having a higher magnetic permeability than the core body 51 (e.g., iron material).

The radially inner end of each separate core member 52 is fitted to the corresponding second fixing portion 54, and the part of the separate core member 52 other than the fitted part projects outward in the radial direction from the outer circumferential surface (first fixing portions 53) of the core body 51. One circumferential side of the part of each separate core member 52 projecting from the core body 51 is adjacent to an N-pole permanent magnet 25 with a gap K located in between, and the other circumferential side is adjacent to an S-pole permanent magnet 25 with a gap K located in between. The open angle of each separate core member 52 about the axis L is smaller by an amount corresponding to the gaps K than the open angle of each magnet pole pair P (90°). Further, in an axial view, the separate core members 52 are line-symmetric with respect to a center line L2 of the magnet pole pairs P in the circumferential direction, and the center line of the separate core members 52 in the circumferential direction (center line L2) and the center line L3 of the magnet pole pairs P in the circumferential direction (border line of adjacent magnet poles Mn and Ms) form an angle of 90°. The outer circumferential surface of each separate core member 52 is arcuate and extends about the axis L as viewed in the direction of the axis L of the rotation shaft 23. The outer circumferential surfaces of the separate core members 52 and the outer circumferential surfaces of the permanent magnets 25 lie along the same circle extending about the axis L.

With such a structure, the separate core members 52 function as flux toleration portions in the same manner as the projections 24 of the above embodiment. That is, field weakening flux (flux linkage generated by application of field weakening current) from the opposing windings 13 passes through the separate core members 52. It is desirable that the open angle (circumferential width) of the separate core members 52 be set to include the magnetic path of the field weakening flux (d-axis magnetic path Pd). More specifically, it is desirable that the open angle of the separate core members 52 be set to an angle (45° in the present example) that is obtained by equally dividing the rotor 21 in the circumferential direction by two times the total number of the magnet poles Mn and Ms (eight in the present example). In the example shown in FIG. 27, the open angle of the separate core members 52 is set to approximately 75° to 85° but may instead be set to 75° or less.

The separate core members 52, which form the flux tolerance portions, are separate from the core body 51 that includes the magnet pole pairs P (N-magnet pole Mn and S-magnet pole Ms). This limits interference between the magnetic path of the field weakening flux in the separate core members 52 (d-axis magnetic path Pd) and the magnetic path of the magnet poles Mn and Ms in the core body 51 (in particular, magnetic path of short-circuit flux between one magnet pole pair P and the other magnet pole pair P). As a result, the field weakening flux smoothly passes through the separate core members 52. This contributes to further increasing the rotation speed.

Further, in this structure, the separate core members 52 are formed from a material having a higher magnetic permeability than the core body 51. This allows for further smooth passage of the field weakening flux through the separate core members 52 and contributes to further increasing the rotation speed. Further, among the components of the rotor core 22, at least the separate core members 52 are formed from a material having high magnetic permeability, and the core body 51 is formed from an inexpensive material (iron or the like). Thus, the rotation speed can be increased while limiting increases in the manufacturing cost.

In the structure shown in FIG. 27, the configuration including the separate core members 52 is applied to a surface magnet structure (SPM structure) but may be applied to an interior magnet structure (IPM structure)

Figure 28:
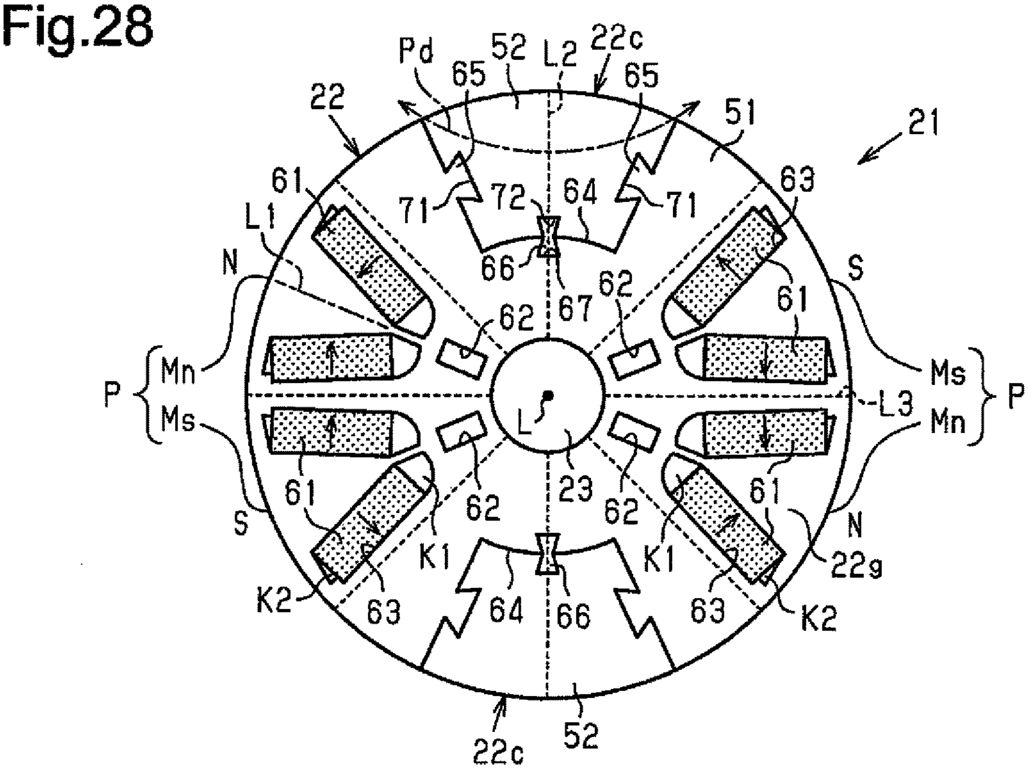
FIG. 28 is a plan view of a rotor in a further example.

FIG. 28 shows one example of a rotor 21 to which an IPM structure including the separate core members 52 is applied. In the rotor 21 shown in FIG. 28, the circumferential positions of the magnet poles Mn and Ms in the core body 51 are substantially the same as the IPM structures described above (for example, refer to structure of FIG. 7).

The magnet poles Mn and Ms each include a pair of permanent magnets 61 embedded in the core body 51. In each of the magnet poles Mn and Ms, the pair of permanent magnets 61 are arranged in a generally V-shaped layout that widens toward the outer circumference in an axial view. Further, the two permanent magnets 61 are in line-symmetry with respect to a pole center line (refer to line L1 in FIG. 28) in the circumferential direction. Each permanent magnet 61 is a parallelepiped. Further, the pair of permanent magnets 61 in each of the magnet poles Mn and Ms is arranged to be included in an angular range (range of 45° in present example) obtained by dividing the rotor 21 in the circumferential direction by two times the total number of the magnet poles Mn and Ms (eight in the present example)

In FIG. 28, the arrows in solid lines indicate the magnetizing direction of the permanent magnets 61 in the N-magnet pole Mn and the S-magnet pole Ms. The distal side of the arrow indicates the N-pole, and the basal side of the arrow indicates the S-pole. As shown by the arrows, the permanent magnets 61 in the N-magnet poles Mn are magnetized so that the opposing surfaces (surfaces closer to pole center line) function as the N-poles in order for the portions at the outer circumferential side of the magnet poles Mn to function as the N-poles. Further, the permanent magnets 61 in the S-magnet pole Ms are magnetized so that the opposing surfaces (surfaces closer to pole center line) function as the S-poles in order for the portions at the outer circumferential side of the magnet poles Ms to function as the S-poles.

The core body 51 includes magnetic resistance holes 62 at positions located toward the inner circumference from the pair of permanent magnets 61 in each of the magnet poles Mn and Ms. The magnetic resistance holes 62 are rectangular holes elongated in the radial direction in an axial view and located at circumferentially central positions in the magnet poles Mn and Ms. In the present example, the centers of the magnetic resistance holes 62 are spaced apart by 45° in the magnet poles Mn and Ms that are adjacent to each other in the circumferential direction. Each magnetic resistance hole 62 extends through the core body 51 in the axial direction, and the inside of each magnetic resistance hole 62 is a gap. As a result, the magnetic resistance holes 62 reduce short-circuit flux between the magnet poles Mn and Ms that are adjacent to each other in the circumferential direction. This contributes to increasing the torque.

Gaps K1 and K2 are respectively arranged at the inner circumference side and outer circumference side of each permanent magnet 61. The gaps K1 and K2 are portions of a magnet receptacle 63 formed in the core body 51 to receive the corresponding permanent magnet 61. Each permanent magnet 61 includes a side surface located at the inner circumference side that faces the corresponding gap K1 and a side surface located at the outer circumference side that faces the corresponding gap K2. More specifically, the gap K1 is located between each permanent magnet 61 and the radially inner end of the corresponding magnet receptacle 63, and the gap K2 is located between each permanent magnet 61 and the radially outer end of the corresponding magnet receptacle 63. The magnetic resistance of each of the gaps K1 and K2 reduces short-circuit flux in the permanent magnets 61 (short-circuit flux of each permanent magnet 61 between N and S poles through the core body 51). This contributes to increasing the torque.

Fixing recesses 64 are recessed inward in the radial direction from the outer circumferential surface of the core body 51 between the magnet pole pairs P of the core body 51. The two circumferential end surfaces of each fixing recess 64 is planar and extends in the radial direction, and the two end surfaces each include a connection projection 65 projecting in the circumferential direction into the fixing recess 64. Each connection projection 65 is tapered so that the width in the radial direction of the rotor 21 increases toward the distal end of the projection (circumferential distal end). Further, the circumferentially central portion in the radially inner surface of the fixing recess 64 includes a main body connection recess 67 to which a connection member 66 is connected.

Separate core members 52, which are separate from the core body 51, are fitted to the fixing recesses 64. The outer circumferential surface of each separate core member 52 is arcuate and extends about the axis L as viewed in the direction of the axis L of the rotation shaft 23. Further, the outer circumferential surfaces of the separate core members 52 are flush with the outer circumferential surface of the core body 51. The two circumferential end surfaces of each separate core member 52 are planar and extend in the radial direction. Further, the two circumferential end surfaces and radially inner surface of each separate core member 52 contact the two circumferential ends surfaces and radially inner surface of the corresponding fixing recess 64.

The two circumferential end surfaces of each separate core member 52 include first connection recesses 71. The connection projections 65 of the core body 51 are fitted to the first connection recesses 71. The first connection recesses 71 are identical in shape to the connection projections 65 of the core body 51. The circumferentially central portion in the radially inner surface of each fixing recess 64 includes a second connection recess 72. The connection member 66 is connected to the second connection recess 72.

The connection member 66 extends across the separate core member 52 and the core body 51 at the circumferentially inner side of the separate core member 52 and connects the separate core member 52 and the core body 51. In detail, the circumferential width of the connection member 66 increases in a tapered manner from the radially central portion toward the two radial ends. The radially inner half of the connection member 66 is fitted to the main body connection recess 67 in the core body 51, and the radially outer half of the connection member 66 is fitted to the second connection recess 72 in the separate core member 52. Preferably, the connection member 66 is formed from a material having higher magnetic resistance than the core body 51 and the separate core members 52 (e.g., resin, stainless steel, brass, or the like).

As described above, the separate core members 52 are fixed to the fixing recesses 64 of the core body 51 by fitting the connection projections 65 of the core body 51 to the first connection recesses 71 of the separate core members 52 and by fitting the connection members 66 to the main body connection recesses 67 and the second connection recesses 72. In an axial view, the separate core members 52 are in line-symmetry with respect to the center line L2 between the magnet pole pairs P in the circumferential direction, and the angle is 90° between the circumferential center line (center line L2) of the separate core members 52 and the circumferential center line L3 of the magnet pole pairs P (border line between adjacent magnet poles Mn and Ms). Further, in the structure of FIG. 28, the inner diameter of the separate core members 52 is approximately one half of the outer diameter of the rotor core 22 (outer diameter of core body 51). Instead, the inner diameter of the separate core members 52 may be set to be greater than or equal to one half of the outer diameter of the rotor core 22 or less than or equal to one half of the outer diameter of the rotor core 22.

In such a structure, portions of the rotor core 22 located between the magnet pole pairs P in the circumferential direction function as the flux toleration portions 22*c* in the same manner as the structure shown in FIG. 7. Further, in the structure of FIG. 28, the flux toleration portions 22*c* are partially formed by the separate core members 52. It is desirable that the open angle (circumferential width) of the separate core members 52 be set to include the magnetic path of the field weakening flux. More specifically, it is desirable that the open angle be set to be greater than or equal to the angle (45° in present example) obtained by dividing the rotor 21 in the circumferential direction by two times the total number of the magnet poles Mn and Ms (eight in present example). In the example of FIG. 28, the open angle of the separate core members 52 is set to approximately 45° to 50° but instead may be set to 45° or less or 50° or greater.

In the structure of FIG. 28, the core body 51 is also separate from the separate core members 52. This reduces interference between the magnetic path of the field weakening flux in the separate core members 52 (d-axis magnetic path PD) and the magnetic path of the flux of the magnet poles Mn and Ms in the core body 51 (in particular, magnetic path of shirt-circuit flux between one of the magnet pole pairs P and other one of the magnet pole pairs P). Thus, the field weakening flux easily passes through the separate core members 52 that form parts of the flux toleration portions 22*c*. This further contributes to increasing the rotation speed.

Further, in the structure of FIG. 28, the separate core members 52 are formed from a material having a higher magnetic permeability than the core body 51. This allows for further smooth passage of the field weakening flux through the separate core members 52 and consequently contributes to further increasing the field weakening flux. Among the components of the rotor core 22, at least the separate core members 52 are formed from a material having high magnetic permeability, and the core body 51 is formed from an inexpensive iron material or the like. Thus, the rotation speed can be increased while limiting increases in the manufacturing cost.

Additionally, in the structure of FIG. 28, in the same manner as the example of the IPM structure (for example, FIG. 7), the permanent magnets 61 of the magnet poles Mn and Ms are embedded in the core body 51. This is advantageous for limiting demagnetization of the permanent magnets 61 during field weakening control. Further, in the structure of the magnet poles Mn and Ms (layout of permanent magnets 61) shown in FIG. 28, the volume of the rotor core portion located radially outward from the permanent magnets 61 (outer circumferential core portion 22*g*) can be increased in the same manner as the structure shown in FIG. 11. This allows the reluctance torque to be increased and contributes to further increasing the torque.

In the structures of FIGS. 27 and 28, the separate core members 52 are preferably formed from a material of which axis of easy magnetization (crystal orientation of each magnetization) mainly lies in the circumferential direction. This allows for smooth passage of the field weakening current in the d-axis magnetic passage Pd in the separate core members 52 and consequently contributes to further increasing the rotation speed.

Further, in the structures of FIGS. 27 and 28, the outer circumferential surface of the rotor 21 may be covered by a cylindrical cover member. The cover member will restrict separation of the separate core members 52 from the core body 51.

In the above embodiment, the permanent magnets 25 are sintered magnets but instead may be, for example, bonded magnets.

In the above embodiment, the rotor 21 is embodied in an inner-rotor type motor 10 in which the stator 11 is located at the radially inner side. Instead, the rotor may be embodied in an outer-rotor type motor in which the rotor is located at the radially outer side of the stator.

In the above embodiment, the present invention is embodied in a radial-gap type motor 10 in which the stator 11 and the rotor 21 are opposed to each other in the radial direction. Instead, the present invention may be applied to an axial-gap type motor in which the stator and the rotor are opposed to each other in the axial direction The above embodiment and the modified examples may be combined with one another.

The invention claimed is:

1. A motor comprising:

a stator including windings; and a rotor rotated by a rotation field generated when drive currents are supplied to the windings;

wherein the windings include a first winding and a second winding, in which the first winding and the second winding are synchronously excited by the drive currents and connected in series;

the rotor includes a magnet pole, which includes a permanent magnet, and a flux toleration portion;

the flux toleration portion is opposed to the second winding at a rotational position of the rotor where the magnet pole opposes the first winding, and the flux toleration portion tolerates generation of a flux linkage resulting from a field weakening current at the second winding.

2. The motor according to claim 1, wherein the magnet pole is formed by fixing the permanent magnet to an outer circumferential surface of a rotor core.

3. The motor according to claim 2, wherein the flux toleration portion is a projection of the rotor core formed at the same position in the radial direction as the permanent magnet.

4. The motor according to claim 1, wherein the magnet pole is formed by embedding the permanent magnet in a rotor core.

5. The motor according to claim 4, wherein the magnet pole includes a plurality of magnet receptacles formed in the rotor core, the magnet receptacles are arranged next to each other in a radial direction, the magnet receptacles each receive the permanent magnet, and the magnet receptacles each have a curved form bulged toward a rotor center in an axial view.

6. The motor according to any one of claims 1 to 5, wherein the magnet pole is one of a plurality of N-magnet poles and a plurality of S-magnet poles, the N-magnet poles and the S-magnet poles include a plurality of magnet pole sets, the magnet pole sets each include an N-magnet pole and an S-magnet pole that are arranged adjacent to each other in a circumferential direction, and the magnet pole sets are arranged at equal angular intervals in the circumferential direction.

7. The motor according to any one of claims 1 to 6, wherein the flux toleration portion includes a slit formed in a rotor core, and the flux toleration portion functions as a salient-pole because of the slit.

8. The motor according to claim 7, wherein the slit is one of a plurality of slits, the slits are arranged next to each other in a radial direction, and the slits each have a curved form bulged toward a rotor center in an axial view.

9. The motor according to any one of claims 1 to 8, wherein the magnet pole is one of an N-magnet pole and an S-magnet pole that are adjacent to each other in a circumferential direction, the N-magnet pole and the S-magnet pole that are adjacent to each other form a magnet pole pair, and an open angle of the magnet pole pair is greater than an open angle of the flux toleration portion.

10. The motor according to any one of claims 1 to 9, wherein a rotor core of the rotor includes a core body, which includes the magnet pole, and a separate core member, and the separate core member is a separate component coupled to the core body and forms at least part of the flux toleration portion.

11. The motor according to claim 10, wherein the separate core member is formed from a material having higher magnetic permeability than the core body.

* * * * *